(12) United States Patent
Aramaki et al.

(10) Patent No.: US 10,150,454 B2
(45) Date of Patent: Dec. 11, 2018

(54) VEHICLE WINDOW WASHER DEVICE

(71) Applicant: Toyota Jidosha Kabushiki Kaisha, Toyota-shi (JP)

(72) Inventors: Hirokatsu Aramaki, Okazaki (JP); Satoru Okuya, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 167 days.

(21) Appl. No.: 15/053,033

(22) Filed: Feb. 25, 2016

(65) Prior Publication Data
US 2016/0339876 A1    Nov. 24, 2016

(30) Foreign Application Priority Data
May 22, 2015    (JP) .................................. 2015-104423

(51) Int. Cl.
*B60S 1/52*    (2006.01)
*B60S 1/04*    (2006.01)
(Continued)

(52) U.S. Cl.
CPC .................. *B60S 1/524* (2013.01); *B60J 1/00* (2013.01); *B60S 1/0463* (2013.01);
(Continued)

(58) Field of Classification Search
CPC .... B60S 1/482; B60S 1/46; B60S 1/48; B60S 1/52; B60S 1/522; B60S 1/524;
(Continued)

(56) References Cited

U.S. PATENT DOCUMENTS 3,237,868 A * 3/1966 Lovell ..................... B60S 1/481
                                                        15/250.3
3,300,143 A * 1/1967 Lawson ................. B60S 1/482
                                                        138/107
(Continued)

FOREIGN PATENT DOCUMENTS

DE           29 41 188 A1      4/1981
DE     10 2013 212 394 A1     12/2014
(Continued)

OTHER PUBLICATIONS

Machine language translation of description portion of German publication 102013215194, published Feb. 2015.*
Extended European Search Report dated Sep. 26, 2016 in Patent Application No. 16157391.0.
Office Action dated Jun. 20, 2017 in Japanese Patent Application No. 2015-104423 (with English language translation).

*Primary Examiner* — Gary Graham
(74) *Attorney, Agent, or Firm* — Oblon, McClelland, Maier & Neustadt, L.L.P.

(57) ABSTRACT

A vehicle window washer device having: a washer tank that stores washer fluid; a washer pump having one end connected to the washer tank and another end connected to one end portion of a hose; a washer nozzle connected to another end portion of the hose; a control unit that drives the washer pump to supply the washer fluid stored in the washer tank to the washer nozzle via the hose; and a supply portion that is placed in a wiping region, wiped by a wiper blade, of a windshield glass, is disposed in the washer nozzle or the windshield glass so as to not project from a wiping surface, and supplies the washer fluid from a supply port to the wiping surface.

5 Claims, 29 Drawing Sheets

(51) Int. Cl.
*B62D 25/00* (2006.01)
*B60J 1/00* (2006.01)
*B60S 1/50* (2006.01)

(52) U.S. Cl.
CPC ............... *B60S 1/0486* (2013.01); *B60S 1/50* (2013.01); *B60S 1/52* (2013.01); *B62D 25/00* (2013.01)

(58) Field of Classification Search
CPC ........ B60S 1/528; B60S 1/481; B60S 1/0463; B60S 1/0486; B60J 1/00
USPC ....... 15/250.01–250.04; 52/171.3; 239/284.1
See application file for complete search history.

(56) References Cited

U.S. PATENT DOCUMENTS

| | | | | |
|---|---|---|---|---|
| 4,285,089 | A | * | 8/1981 | Takahashi ............... B60S 1/482 15/250.02 |
| 4,531,255 | A | * | 7/1985 | Yagasaki ............... B60S 1/0438 15/250.01 |
| 2001/0003352 | A1 | | 6/2001 | Ruden et al. |

FOREIGN PATENT DOCUMENTS

| | | |
|---|---|---|
| DE | 10 2013 215 194 A1 | 2/2015 |
| JP | 57-457 U | 1/1982 |
| JP | 11-34814 | 2/1999 |

\* cited by examiner

FIG. 8(A)
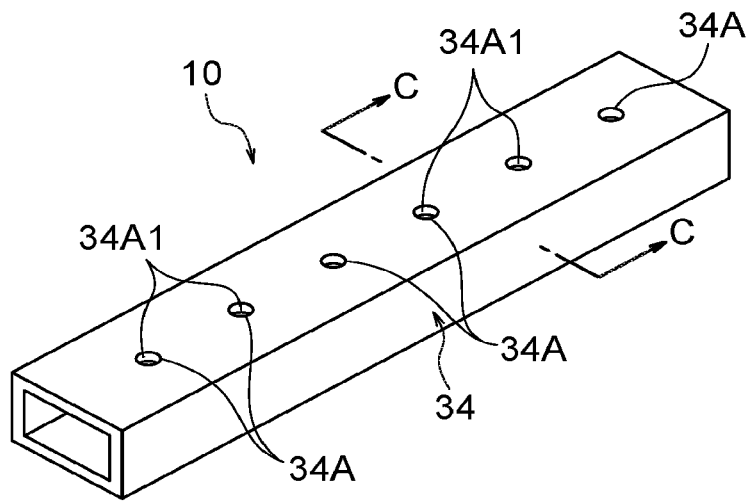
FIG. 8(B)
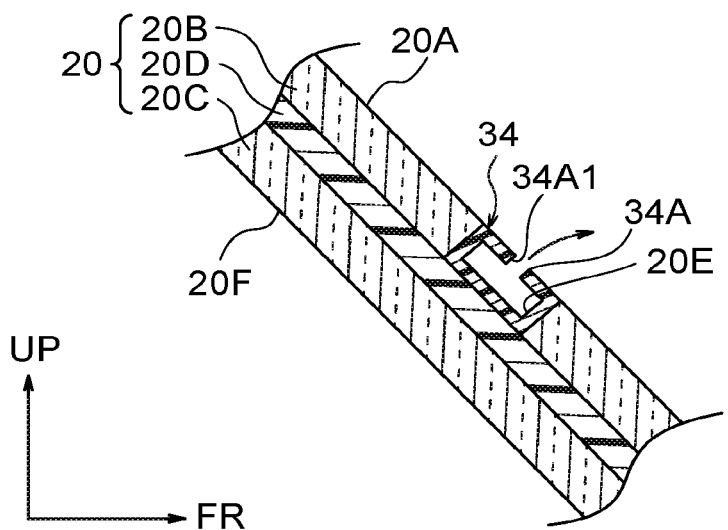

FIG. 10
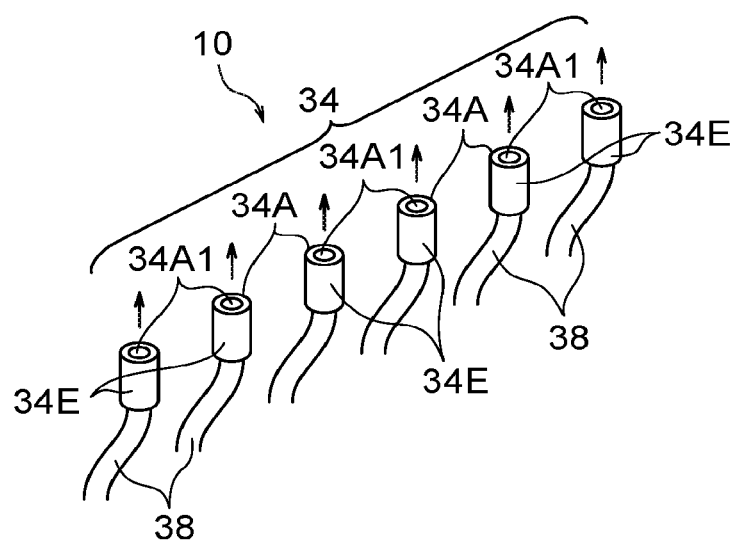
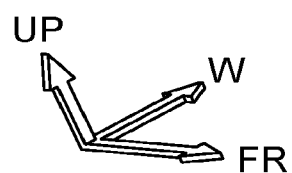

FIG. 13
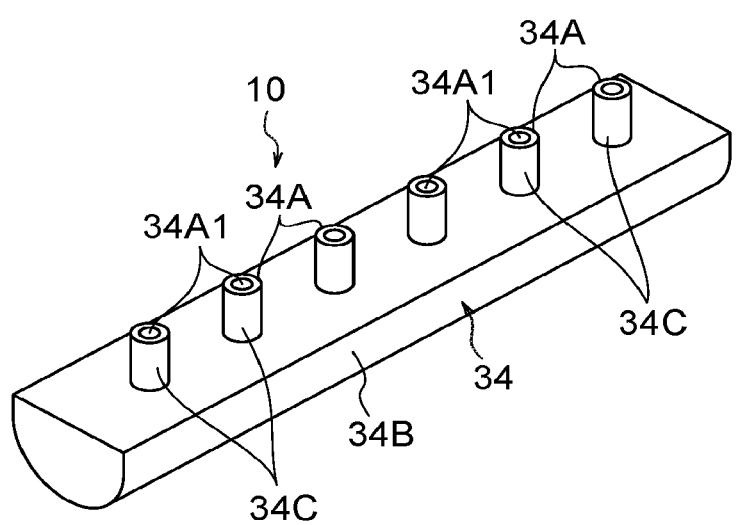
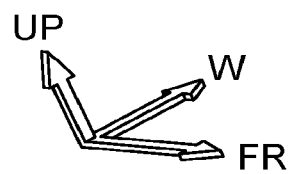

FIG. 15
FIG. 15(A)
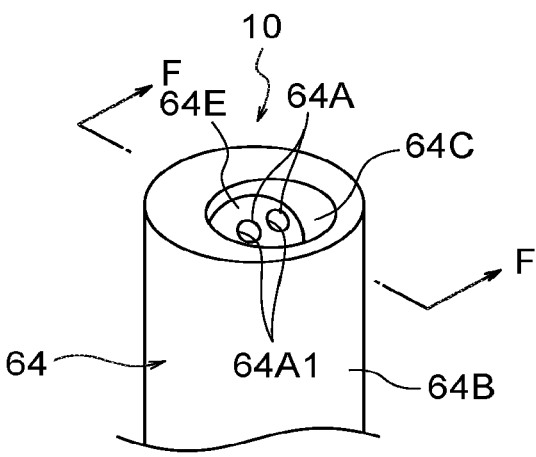
FIG. 15(B)
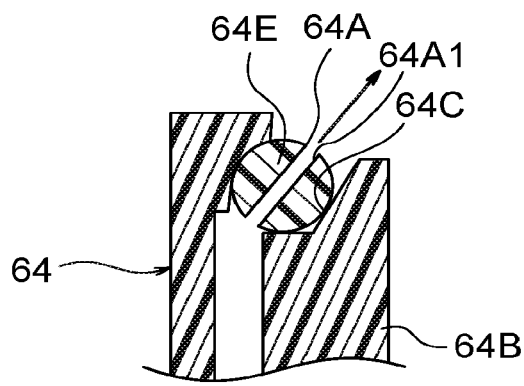
FIG. 15(C)
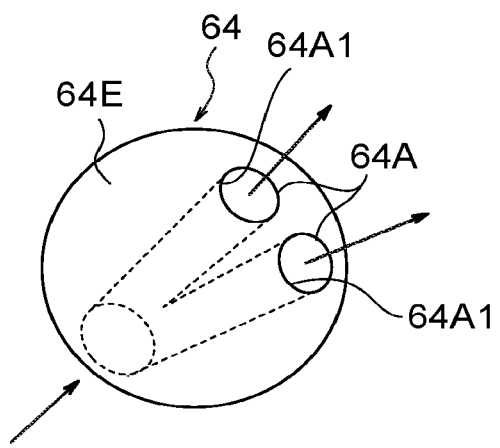

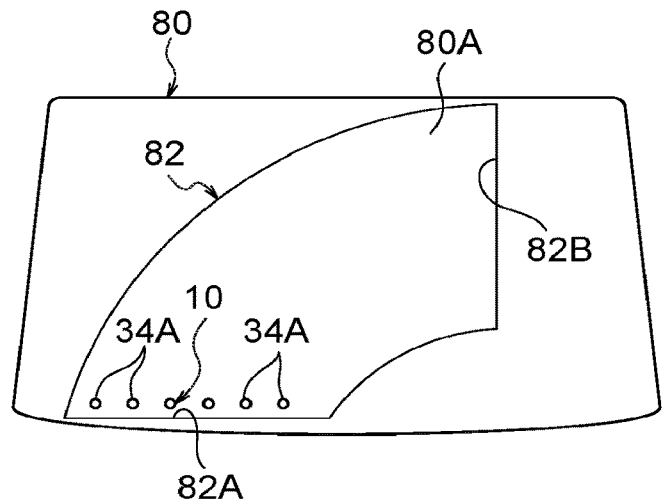
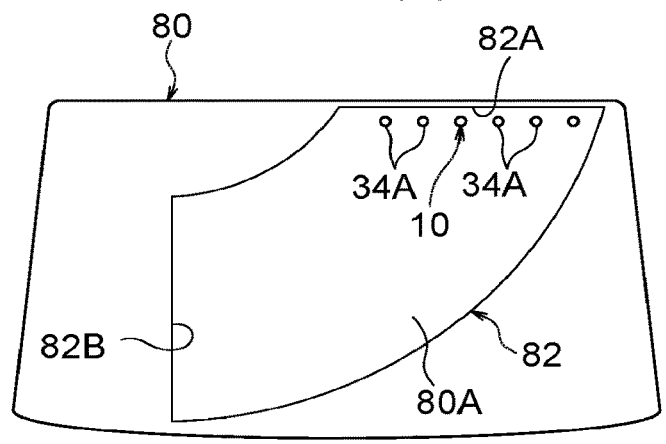
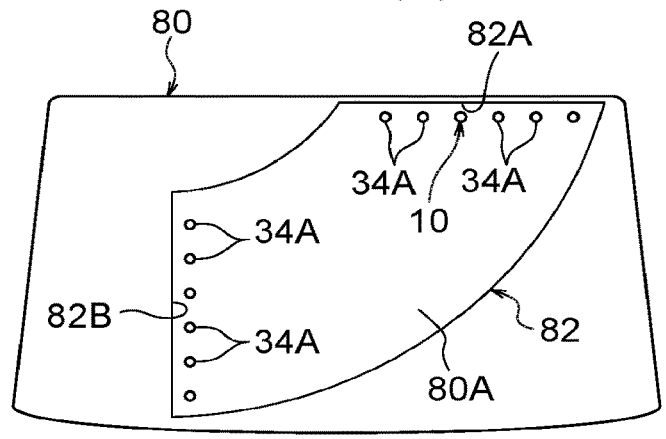

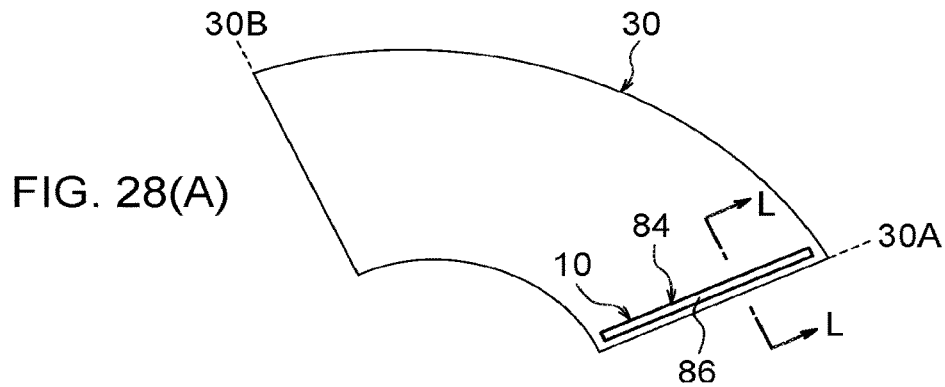
FIG. 28(A)
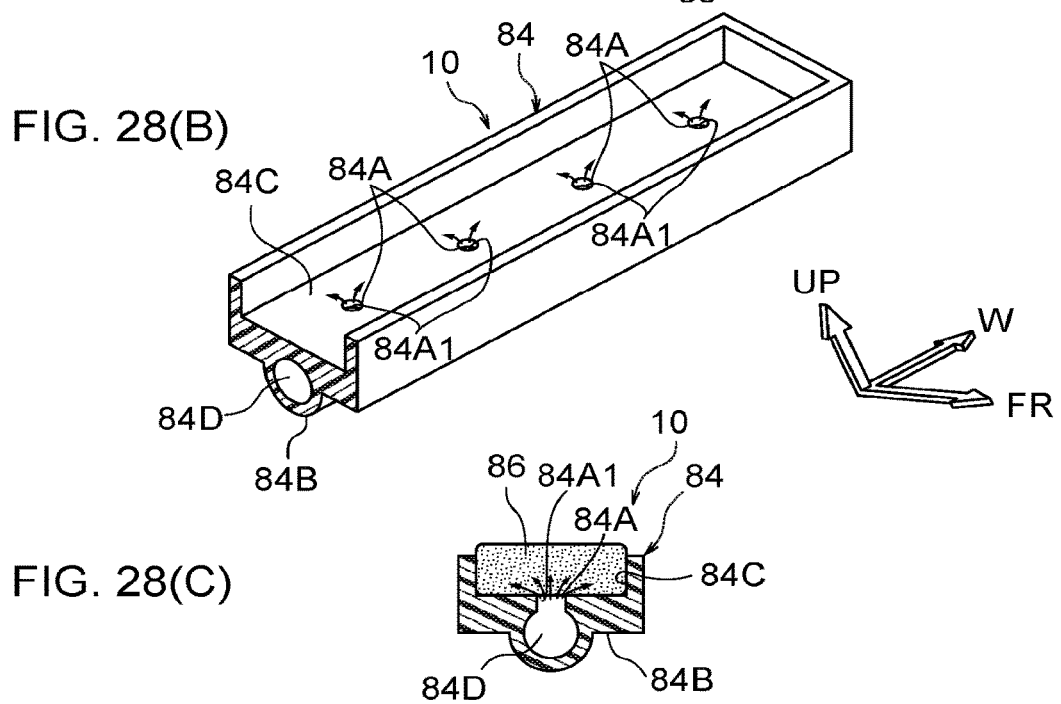
FIG. 28(B)
FIG. 28(C)
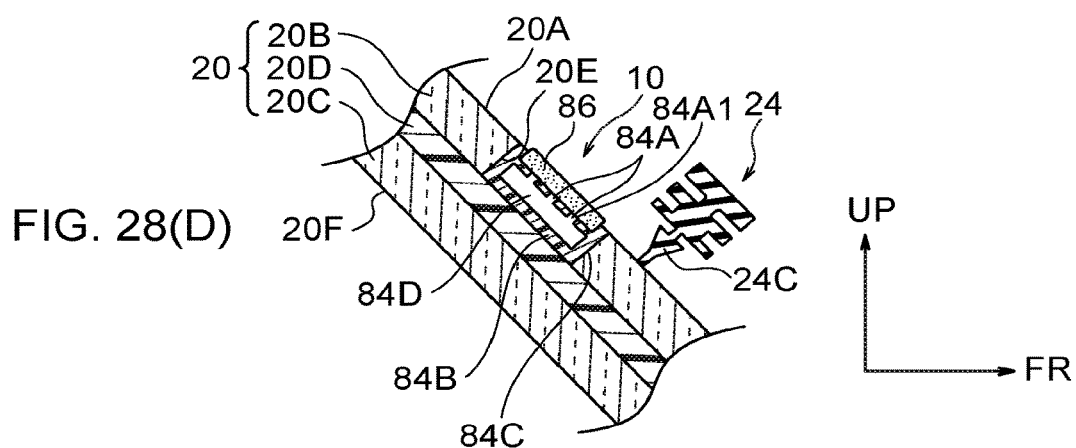
FIG. 28(D)

VEHICLE WINDOW WASHER DEVICE

CROSS-REFERENCE TO RELATED APPLICATION

This application is based on and claims priority under 35 USC 119 from Japanese Patent Application No. 2015-104423 filed on May 22, 2015, the disclosure of which is incorporated by reference herein.

BACKGROUND

Technical Field

The present invention relates to a vehicle window washer device.

Related Art

Japanese Patent Application Laid-open (JP-A) No. H11-34814 discloses a washer nozzle attachment device. In this washer nozzle attachment device, a washer nozzle is attached to an upper portion of a peripheral edge of a tailgate glass of a vehicle. The washer nozzle jets cleaning fluid onto the tailgate glass. When the cleaning fluid sticking to the tailgate glass is wiped by a rear wiper, dirt on the tailgate glass is removed.

In the above-described washer nozzle attachment device, the washer nozzle is attached in a position away from a wiping region, wiped by the rear wiper, of the tailgate glass. For this reason, it is conceivable for the cleaning fluid jetted from the washer nozzle to be swept away by aerodynamic drag, for example, so that the amount of cleaning fluid sticking to the wiping region becomes reduced. Consequently, the above-described washer nozzle attachment device has had room for improvement in order to stably supply the cleaning fluid to the wiping region and efficiently remove dirt in the wiping region.

SUMMARY

In consideration of the circumstances described above, the present invention provides a vehicle window washer device that can stably supply washer fluid to a wiping region of a windshield glass without hindering the back and forth pivoting motion of a wiper blade.

A vehicle window washer device pertaining to a first aspect of the present invention comprises: a washer tank that stores washer fluid; a washer pump having one end connected to the washer tank and another end connected to one end portion of a hose; a washer nozzle connected to another end portion of the hose; a control unit that drives the washer pump to supply the washer fluid stored in the washer tank to the washer nozzle via the hose; and a supply portion that is placed in a wiping region, wiped by a wiper blade, of a windshield glass, is disposed in the washer nozzle or the windshield glass so as to not project from a wiping surface, and supplies the washer fluid from a supply port to the wiping surface.

In the vehicle window washer device pertaining to the first aspect, when the washer pump is driven by the control unit, the washer fluid stored in the washer tank is supplied via the hose to the washer nozzle. For this reason, the washer fluid is discharged from the supply port of the supply portion disposed in the washer nozzle or the windshield glass and is supplied to the wiping region.

Here, the supply portion is disposed so as to not project from the wiping surface in the wiping region, wiped by the wiper blade, of the windshield glass, so the wiper blade that is pivoted back and forth does not interfere with the supply portion. Furthermore, the washer fluid can be directly supplied from the supply portion to the wiping region, so the washer fluid is also not swept away by aerodynamic drag before landing in the wiping region and does not land outside the wiping region.

The vehicle window washer device pertaining to the first aspect has the superior effect that it can stably supply the washer fluid to the wiping region without hindering the back and forth pivoting motion of the wiper blade.

A vehicle window washer device pertaining to a second aspect of the present invention is the vehicle window washer device pertaining to the first aspect, wherein the washer nozzle is formed in the shape of a tube having a closed end portion and is placed in such a way that the longitudinal direction of the washer nozzle coincides with the longitudinal direction of the wiper blade that pivots back and forth, and a plurality of the supply portions are disposed along the longitudinal direction of the washer nozzle.

According to the vehicle window washer device pertaining to the second aspect, a plurality of the supply portions are disposed along the longitudinal direction of the washer nozzle, so the washer fluid is supplied from the plural supply portions to plural places in the longitudinal direction of the wiper blade.

The vehicle window washer device pertaining to the second aspect has the superior effect that it can efficiently clean the wiping region.

A vehicle window washer device pertaining to a third aspect of the present invention is the vehicle window washer device pertaining to the second aspect, wherein a plurality of the supply portions are disposed along a reversal position of the wiper blade that pivots back and forth.

According to the vehicle window washer device pertaining to the third aspect, a plurality of the supply portions are disposed along the reversal position of the wiper blade that pivots back and forth, so it is difficult for the supply portions to enter the field of view of the occupant when the occupant looks in the vehicle forward direction through the front windshield glass, for example, from the driver's seat. Furthermore, it is difficult for the supply portions to enter the field of view of the occupant also when the occupant looks in the vehicle rearward direction through the rear windshield glass, for example, from the driver's seat.

The vehicle window washer device pertaining to the third aspect has the superior effect that it can well maintain the field of view of the occupant.

A vehicle window washer device pertaining to a fourth aspect of the present invention is the vehicle window washer device pertaining to the third aspect, wherein the supply portions are disposed along the reversal position on a storage position side of the wiper blade.

According to the vehicle window washer device pertaining to the fourth aspect, the supply portions are disposed along the reversal position on the storage position side of the wiper blade, so the washer fluid can be supplied to the pivoting direction side of the wiper blade soon after the wiper blade starts pivoting back and forth.

The vehicle window washer device pertaining to the fourth aspect has the superior effect that, because the washer fluid is supplied to the pivoting direction side of the wiper blade soon after the wiper blade starts pivoting back and forth, it can efficiently clean the wiping region soon after the wiper blade starts pivoting back and forth.

A vehicle window washer device pertaining to a fifth aspect of the present invention is the vehicle window washer device pertaining to any one of the first aspect to the fourth aspect, further comprising a position detection unit that detects the pivotal position of the wiper blade in the wiping region, wherein on the basis of the result of the detection by the position detection unit the control unit executes control that drives the washer pump to supply the washer fluid from the supply portion to the wiping surface just before the wiper blade passes the supply portion.

The vehicle window washer device pertaining to the fifth aspect is equipped with the position detection unit, and the position detection unit detects the pivotal position of the wiper blade in the wiping region. The control unit executes control that drives the washer pump to supply the washer fluid from the supply portion to the wiping surface.

Here, on the basis of the result of the detection by the position detection unit the control unit executes control that supplies the washer fluid from the supply portion to the wiping surface just before the wiper blade passes the supply portion. For this reason, the washer fluid can be supplied to the pivoting direction side of the wiper blade just before the wiper blade passes the supply portion because of the back and forth pivoting motion of the wiper blade in the wiping region.

The vehicle window washer device pertaining to the fifth aspect has the superior effect that it can realize control that supplies the washer fluid to the wiping region soon after the pivoting motion of the wiper blade.

A vehicle window washer device pertaining to a sixth aspect of the present invention comprises: a washer tank that stores washer fluid; a washer pump having one end connected to the washer tank and another end connected to one end portion of a hose; a washer nozzle connected to another end portion of the hose; a control unit that drives the washer pump to supply the washer fluid stored in the washer tank to the washer nozzle via the hose; and a supply portion that is placed on the cowl louver side of a wiping region, wiped by a wiper blade, of the windshield glass and a cowl louver disposed along a lower end portion of the windshield glass, is disposed in the washer nozzle or the cowl louver so as to not project from a wiping surface, and supplies the washer fluid from a supply port to the wiping surface.

In the vehicle window washer device pertaining to the sixth aspect, the same action as the action obtained by the vehicle window washer device pertaining to the first aspect can be obtained. In addition, the supply portion is placed on the cowl louver side apart from the windshield glass, so it is difficult for the supply portion to enter the field of view of the occupant when the occupant looks in the vehicle forward direction through the front windshield glass from the driver's seat.

The vehicle window washer device pertaining to the sixth aspect has the superior effect that it can well maintain the field of view of the occupant because the supply portion is placed in the wiping region of the cowl louver.

BRIEF DESCRIPTION OF THE DRAWINGS

Exemplary embodiments of the present invention will be described in detail based on the following figures, wherein:

FIG. 8(A) is a perspective view of a washer nozzle of a vehicle window washer device pertaining to a first example modification of the first exemplary embodiment, and FIG. 8(B) is a sectional view (a sectional view cut along line C-C of FIG. 8(A)) of the washer nozzle shown in FIG. 8(A) and the front windshield glass to which the washer nozzle is attached;

FIG. 10 is a perspective view of a washer nozzle of a vehicle window washer device pertaining to a third example modification of the first exemplary embodiment;

FIG. 13 is a perspective view of a washer nozzle of a vehicle window washer device pertaining to a fifth example modification of the first exemplary embodiment;

FIG. 15(A) is a perspective view of a washer nozzle of a vehicle window washer device pertaining to a first example modification of the second exemplary embodiment, FIG. 15(B) is a sectional view (a sectional view cut along line F-F of FIG. 15(A)) of the washer nozzle shown in FIG. 15(A), and FIG. 15(C) is a perspective view of a constituent part of the washer nozzle shown in FIG. 15(A) and FIG. 15(B);

FIG. 26(A) is a schematic view, corresponding to FIG. 25(A), describing placement positions of supply portions of a washer nozzle of a vehicle window washer device pertaining to a third example modification of the fifth exemplary embodiment, FIG. 26(B) is a schematic view, corresponding to FIG. 26(A), describing placement positions of supply portions of a washer nozzle of a vehicle window washer device pertaining to a fourth example modification, and FIG. 26(C) is a schematic view, corresponding to FIG. 26(A), describing placement positions of supply portions of a washer nozzle of a vehicle window washer device pertaining to a fifth example modification;

FIG. 28(A) is a schematic view, corresponding to FIG. 4, describing placement positions of supply portions of a washer nozzle of a vehicle window washer device pertaining to a seventh exemplary embodiment, FIG. 28(B) is an enlarged perspective view of main parts of the washer nozzle shown in FIG. 28(A), FIG. 28(C) is a sectional view (a sectional view cut along line L-L of FIG. 28(A)) of the washer nozzle shown in FIG. 28(B) and a supply member attached to the washer nozzle, and FIG. 28(D) is a sectional view, corresponding to FIG. 3(C), of the windshield glass and a washer nozzle of a vehicle window washer device pertaining to an example modification of the seventh exemplary embodiment;

DETAILED DESCRIPTION

First Exemplary Embodiment

Figure 1:
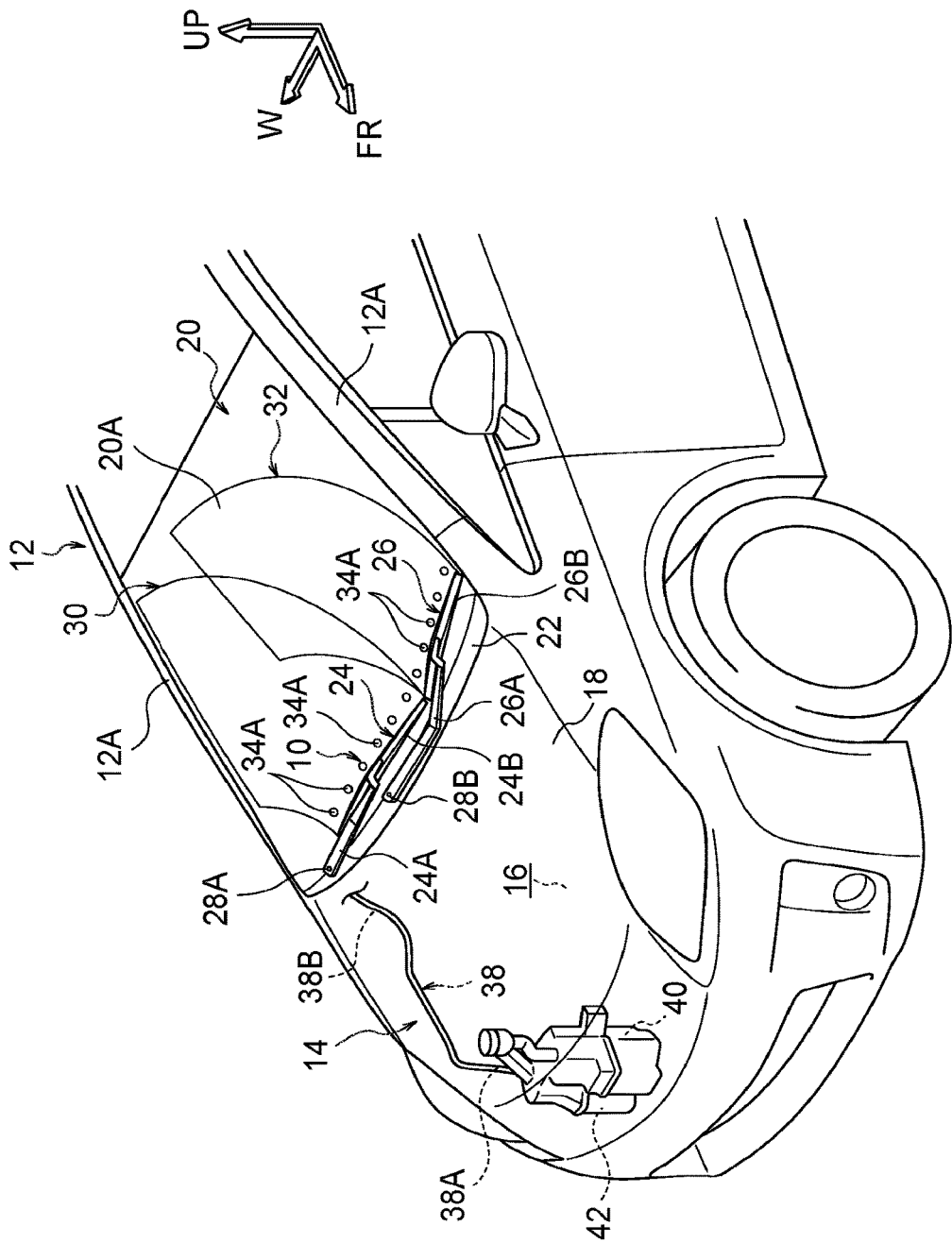
FIG. 1 is a perspective view, as seen from a vehicle front side, showing main parts of a vehicle front portion to which a vehicle window washer device pertaining to a first exemplary embodiment has been applied.

A vehicle window washer device 10 pertaining to a first exemplary embodiment of the present invention will be described using FIG. 1 to FIG. 13. Here, for convenience of description, arrow FR appropriately shown in the drawings indicates a vehicle forward direction of a vehicle such as an automobile, arrow W indicates a vehicle width direction, and arrow UP indicates a vehicle upward direction.

(Configuration of the Vehicle Window Washer Device 10)

As shown in FIG. 1, the vehicle window washer device 10 pertaining to the present exemplary embodiment is applied to a front portion 14 of an automobile 12. An engine compartment 16 is disposed in the front portion 14, and a non-illustrated engine is installed in the engine compartment 16. An engine hood 18 is disposed on the upper portion of the engine compartment 16 in such a way that the engine hood 18 can be opened and closed.

Figure 2:
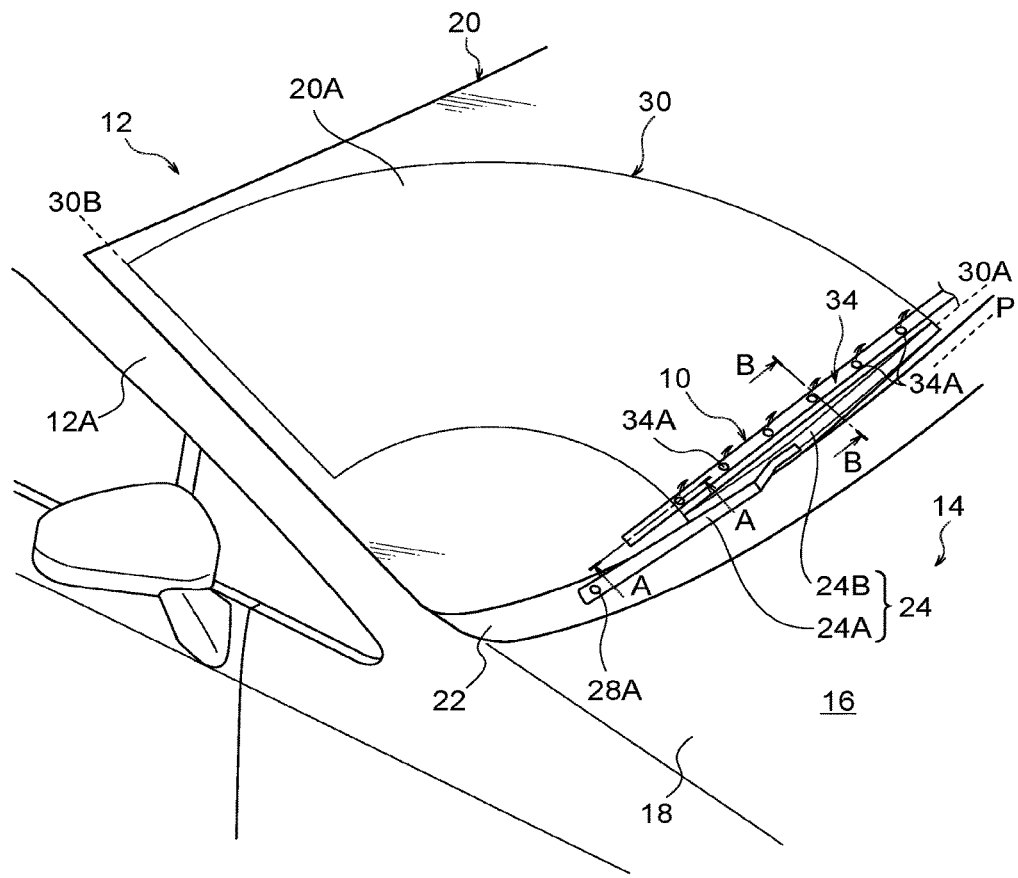
FIG. 2 is an enlarged perspective view showing main parts of the vehicle front portion to which the vehicle window washer device shown in FIG. 1 has been applied.

As shown in FIG. 1 and FIG. 2, a front windshield glass 20 is disposed on the vehicle rear side of the engine hood 18. The front windshield glass 20 extends across the entire vehicle width direction between a pair of right and left front pillars (A-pillars) 12A disposed on vehicle side portions and is attached sloping heading toward the vehicle upper side and the vehicle rear side. Between the rear end portion of the engine hood 18 and the lower end portion of the front windshield glass 20, a cowl louver 22 made of resin that is a vehicle exterior part is disposed on the lower end portion of the front windshield glass 20. The cowl louver 22 extends in such a way that its longitudinal direction coincides with the vehicle width direction along the lower end portion of the front windshield glass 20.

A wiper blade 24 is disposed on the left side of the front windshield glass 20 and a wiper blade 26 is disposed on the right side as seen from the vehicle front side. As shown in FIG. 3(C), the wiper blade 24 is configured to include a blade body 24B and a rubber strip 24C attached to the blade body 24B. The rubber strip 24C is made of a rubber material, for example. As shown in FIG. 1 and FIG. 2, one longitudinal direction end portion of an arm 24A is swingably anchored to the longitudinal direction middle portion of the wiper blade 24. The other longitudinal direction end portion of the arm 24A is a pivotal center of back and forth pivoting motion (a base end portion), extends along the vehicle width direction in accordance with the curved shape of a wiping surface 20A in FIG. 2, and is secured to a pivot shaft 28A of a wiper drive device 52 (see FIG. 5). In the present exemplary embodiment, the pivot shaft 28A is disposed in a shaft hole running through the cowl louver 22 in the vehicle up and down direction, and the wiper drive device 52 is attached inside the engine compartment 16 on the vehicle lower side of the cowl louver 22. The wiper blade 24 shown in FIG. 2 has stopped pivoting back and forth and is in a storage position P on the lower end portion side of the front windshield glass 20.

The basic configuration of the wiper blade 26 is the same as the basic configuration of the wiper blade 24, so the wiper blade 26 is configured to include a blade body 26B and a rubber strip (see FIG. 3(C)). One longitudinal direction end portion of an arm 26A is swingably anchored to the longitudinal direction middle portion of the wiper blade 26. The other longitudinal direction end portion of the arm 26A is secured to a pivot shaft 28B of the wiper drive device 52, with the pivot shaft 28B serving as a pivotal center of back and forth pivoting motion. The wiper blade 26 shown in FIG. 1 is stopped has stopped pivoting back and forth and is in a storage position on the lower end portion side of the front windshield glass 20.

Figure 4:
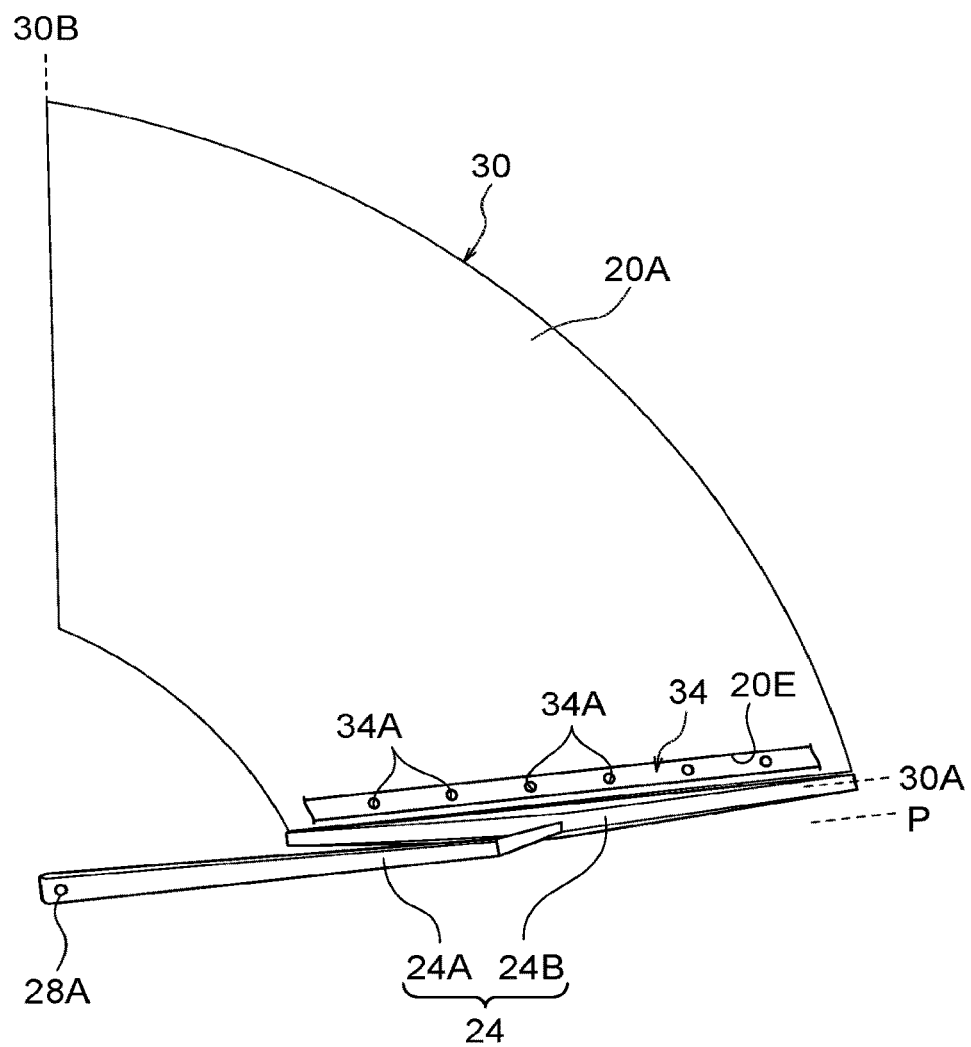
FIG. 4 is a schematic view describing the positional relationship between a wiping region, a wiper blade, and supply portions of the washer nozzle in the vehicle window washer device shown in FIG. 1.

As shown in FIG. 1, FIG. 2, and FIG. 4, the region, wiped by the rubber strip 24C because of the back and forth pivoting motion of the wiper blade 24, of the front windshield glass 20 is a wiping region 30. Additionally, the surface, on the vehicle outer side wiped by the rubber strip 24C, of the wiping region 30 of the front windshield glass 20 is a wiping surface 20A. The wiping region 30 is shaped like a fan as seen from the vehicle front side, with the pivot shaft 28A serving as a pivotal center. In the wiping region 30 the wiper blade 24 reverses direction at, and pivots back and forth between, one reversal position (here, a lower reversal position) 30A and another reversal position (here, an upper reversal position) 30B on the opposite side of the one reversal position 30A. In the present exemplary embodiment, the storage position P of the wiper blade 24 is set on the lower side of the one reversal position 30A. It should be noted that the one reversal position 30A may also be coincident with the storage position P. In the wiping region 30, dirt on the wiping surface 20A is removed by the back and forth pivoting motion of the wiper blade 24 and the supply of washer fluid described later.

Like the wiping region 30, a wiping region 32 shown in FIG. 1 is shaped like a fan, and dirt thereon is removed by the back and forth pivoting motion of the wiper blade 26 and the supply of washer fluid thereto. In the wiping region 32, one reversal position (a lower reversal position) is on the storage position side of the wiper blade 26 and another reversal position (an upper reversal position) is on the opposite side of the storage position.

Figure 3A:
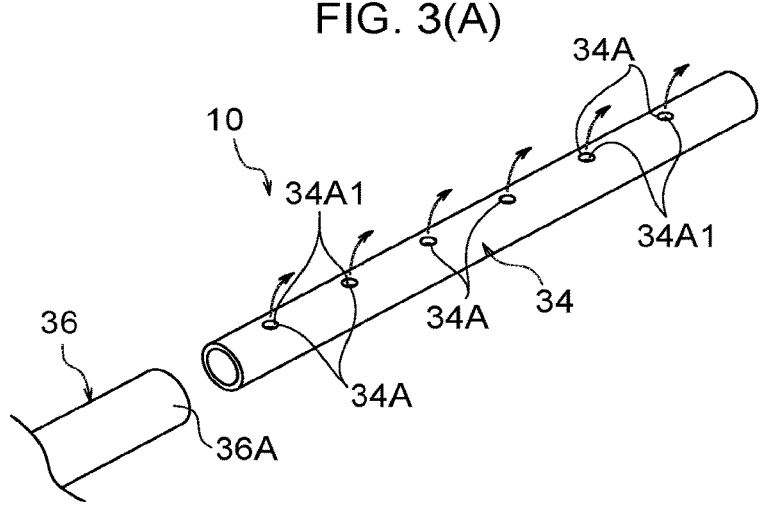
FIG. 3(A) is a perspective view of a washer nozzle of the vehicle window washer device shown in FIG. 1 and FIG. 2.
Figure 3B:
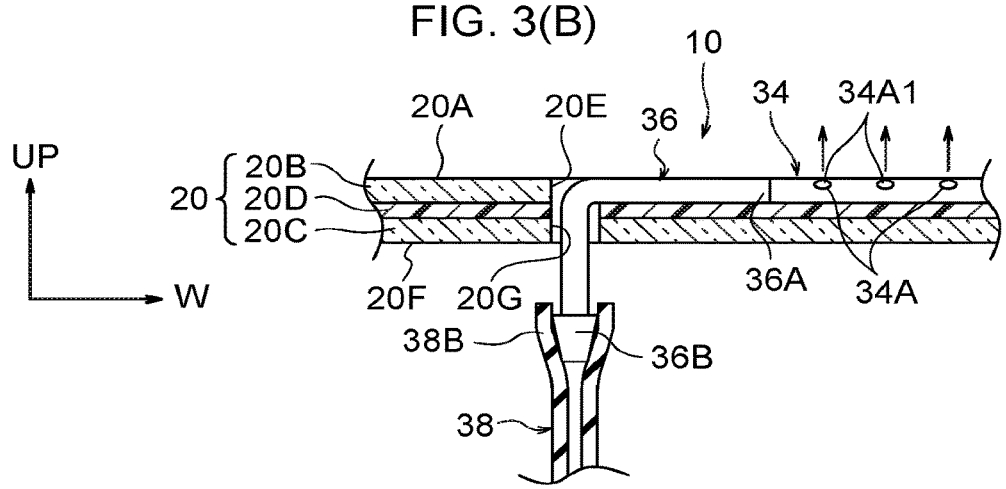
FIG. 3(B) is a sectional view (a sectional view cut along line A-A of FIG. 2) of a front windshield glass of the vehicle to which the washer nozzle shown in FIG. 2 is attached.
Figure 3C:
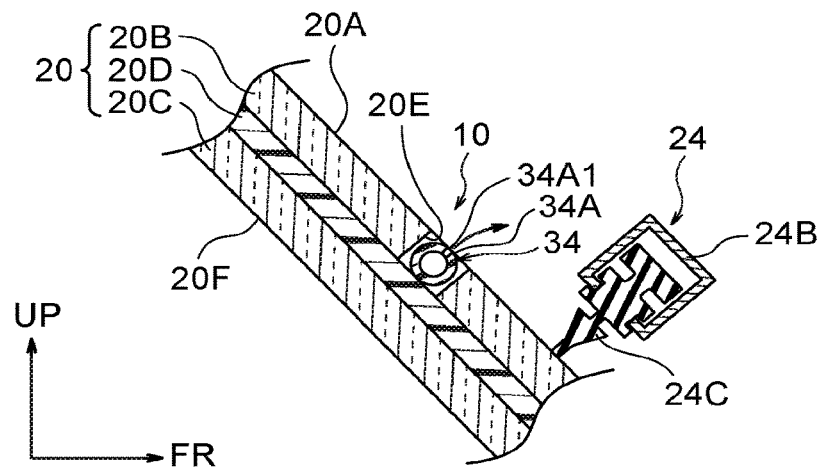
FIG. 3(C) is a sectional view (a sectional view cut along line B-B of FIG. 2) of the front windshield glass to which the washer nozzle shown in FIG. 2 is attached.
Figure 5:
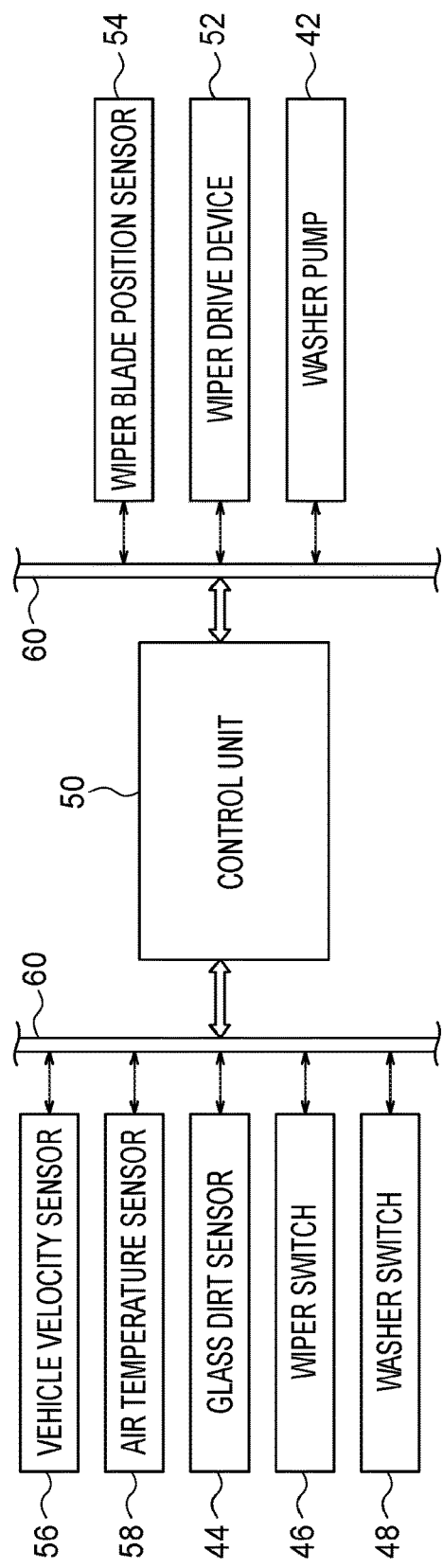
FIG. 5 is a system configuration diagram constructing a control system of the vehicle window washer device shown in FIG. 1.

The vehicle window washer device 10 pertaining to the present exemplary embodiment is equipped with a washer tank 40 and a washer pump 42 shown in FIG. 1 and FIG. 5, a hose 38 shown in FIG. 1 and FIG. 3(B), a washer nozzle 34 shown in FIG. 1, FIG. 2, FIG. 3(A) to FIG. 3(C), and FIG. 4, and a control unit 50 shown in FIG. 5. As shown in FIG. 3(A) to FIG. 3(C), supply portions 34A equipped with supply ports 34A1 are disposed in the washer nozzle 34, and the supply portions 34A are disposed in each of the wiping region 30 and the wiping region 32. The supply portions 34A supply the washer fluid from the supply ports 34A1 to the wiping surface 20A of each of the wiping region 30 and the wiping region 32.

Specifically, as shown in FIG. 3(B) and FIG. 3(C), laminated glass is used for the front windshield glass 20. The laminated glass is formed by laminating in the plate thickness direction a single plate glass 20B on the vehicle outer side and a single plate glass 20C on the vehicle inner side via an intermediate film 20D. Polyvinyl butyral (PVB) resin, for example, is used as the intermediate film 20D. A groove portion 20E is disposed in the single plate glass 20B of the front windshield glass 20, and the washer nozzle 34 is attached inside the groove portion 20E. The groove portion 20E is disposed in such a way that its longitudinal direction coincides with the vehicle width direction along the longitudinal direction of the wiper blade 24 in the storage position P shown in FIG. 1 and FIG. 2, is elongate as seen in a vehicle front view, has a transverse direction cross section formed in the shape of a square U, and is formed on the one reversal position 30A side of the wiping region 30. The groove portion 20E may be formed only inside the wiping region 30 or may be formed ranging from the wiping region 30 to the outer side thereof. Furthermore, here, the groove portion 20E runs through the single plate glass 20B so that the intermediate film 20D is exposed in the groove bottom surface, but the groove portion 20E may also be formed in the shape of a square U by scooping out part of the single plate glass 20B from the wiping surface 20A in the plate thickness direction.

The washer nozzle 34 is formed in the shape of a long and narrow circular tube whose longitudinal direction coincides with its tube axial direction and is attached inside the groove portion 20E in such a way that its tube axial direction coincides with the longitudinal direction of the groove portion 20E. That is to say, the washer nozzle 34 is formed along the longitudinal direction of the wiper blade 24, and the longitudinal direction of the washer nozzle 34 coincides with the longitudinal direction of the wiper blade 24. In the present exemplary embodiment, the washer nozzle 34 is fitted into the groove portion 20E. Furthermore, the washer nozzle 34 may also be adhered to the groove portion 20E via an adhesive. A plurality of the supply portions 34A are formed at regular intervals along the longitudinal direction of the washer nozzle 34 in the top portion of the washer nozzle 34. Here, the open shape of the supply ports 34A1 of the supply portions 34A is circular. It should be noted that the open shape of the supply ports 34A1 is not limited to being circular and may also be elliptical, square, or polygonal, for example. As shown in FIG. 2, FIG. 3(C), and FIG. 4, the supply ports 34A are placed along the wiper blade 24 in positions reached soon after the wiper blade 34 starts pivoting and on the wiping region 30 middle side of the wiper blade 24 in the storage position P and the one reversal position 30A.

Moreover, in the present exemplary embodiment, the supply portions 34A are disposed so as to not project toward the vehicle outer side from the wiping surface 20A of the front windshield glass 20. Here, "so as to not project" means that the supply portions 34A substantially do not hinder the back and forth pivoting motion of the wiper blade 24, and this includes a case where the supply portions 34A project a little from the wiping surface 20A provided that the amount of projection is equal to or less than 0.1 mm, for example, so that the supply portions 34A substantially do not hinder the back and forth pivoting motion of the wiper blade 24. In the present exemplary embodiment, the supply portions 34A are disposed in positions where they are coincident (even) with the wiping surface 20A. It should be noted that the supply portions 34A may also be placed on the vehicle inner side (the cabin inner side) of positions where they are coincident with the wiping surface 20A. For example, the supply portions 34A may also be placed between the wiping surface 20A of the front windshield glass 20 and a surface 20F on the opposite side. Furthermore, in the present exemplary embodiment, the groove portion 20E and the washer nozzle 34 are placed continuously in the vehicle width direction from the wiping region 30 to the wiping region 32. The configurations of the washer nozzle 34 and the supply portions 34A in the wiping region 32 are the same as the configurations of the washer nozzle 34 and the supply portions 34A in the wiping region 30, so description of the same configurations will be omitted.

As shown in FIG. 1, the washer tank 40 is disposed inside the engine compartment 16, and the washer fluid that is supplied to the front windshield glass 20 is stored in the washer tank 40. Furthermore, the washer tank 40 may also store washer fluid that is supplied to a later-described rear windshield glass 80 shown in FIG. 25(A) and elsewhere.

The washer pump 42 shown in FIG. 1 and FIG. 5 is disposed in the neighborhood of the washer tank 40. In the present exemplary embodiment, the washer tank 40 and the washer pump 42 are manufactured as a single assembly. One end of the washer pump 42 is connected to the washer tank 40, and another end is connected to the hose 38. When the washer pump 42 is driven by the control unit 50 shown in FIG. 5, the washer pump 42 supplies the washer fluid stored in the washer tank 40 to the washer nozzle 34 via the hose 38 and a coupling tube 36. As shown in FIG. 1, the hose 38 is routed from the engine compartment 16 to the lower portion of the cowl louver 22. One end portion 38A of the hose 38 is connected to the washer pump 42. As shown in FIG. 3(B), another end portion 38B of the hose 38 is connected to another end portion 36B of the coupling tube 36 on the vehicle inner side. The one end portion 36A of the coupling tube 36 is connected to the washer nozzle 34 through a through hole 20G formed through the single plate glass 20C and the intermediate film 20D in the groove portion 20E. The one end portion 36A is bent with respect to another end portion 36B and extends along the groove portion 20E.

FIG. 5 shows the system configuration of the vehicle window washer device 10. The washer pump 42 of the vehicle window washer device 10 is connected to a washer switch 48 via a bus line 60. Furthermore, the control unit 50 is connected to the bus line 60. In the present exemplary embodiment, a wiper/washer electronic control unit (ECU) is used as the control unit 50. Here, an engine control unit (ECU) that controls the operation of the engine can be utilized as the control unit 50. Moreover, the wiper drive device 52, a wiper blade position detection sensor 54 serving as a position detection unit, and a wiper switch 46 are connected to the bus line 60. The wiper drive device 52 is equipped with a non-illustrated wiper motor and a link mechanism that causes the wiper blade 24 and the wiper blade 26 to pivot back and forth. When the wiper switch 46 is switched on, the wiper drive device 52 is controlled and driven by the control unit 50. In the vehicle window washer device 10, when the washer switch 48 is switched on, the washer pump 42 is driven and the washer fluid stored in the washer tank 40 is supplied to the washer nozzle 34. Additionally, in the vehicle window washer device 10, the action of supplying the washer fluid and the action of pivoting back and forth the wiper blade 26 (wiping action) are performed in conjunction with each other.

Furthermore, the vehicle window washer device 10 is equipped with a glass dirt sensor 44, a vehicle velocity sensor 56, and an air temperature sensor 58 in addition to the wiper blade position detection sensor 54 shown in FIG. 5. The glass dirt sensor 44, the vehicle velocity sensor 56, and the air temperature sensor 58 are connected to the control unit 50 via the bus line 60. The wiper blade position detection sensor 54 detects the position of the wiper blade 24 in the wiping region 30 and the position of the wiper blade 26 in the wiping region 32. A Hall element that detects the rotational position of the wiper motor, for example, is used as the wiper blade position detection sensor 54. The glass dirt sensor 44 detects dirt on the wiping surface 20A of the front windshield glass 20. The vehicle velocity sensor 56 detects the traveling velocity of the automobile 12. Additionally, the air temperature sensor 58 detects the temperature outside the vehicle. Information such as the position information, dirt information, velocity information, and temperature information detected by these sensors is sent to the control unit 50.

(Action and Effects of the Present Exemplary Embodiment)

In the vehicle window washer device 10 pertaining to the present exemplary embodiment, the washer pump 42 shown in FIG. 1 and FIG. 5 is driven by the control unit 50 shown in FIG. 5. When the washer pump 42 is driven, the washer fluid stored in the washer tank 40 is supplied via the hose 38 to the washer nozzle 34. For this reason, the washer fluid is discharged from the supply ports 34A1 of the supply portions 34A disposed in the washer nozzle 34 and is supplied to the wiping region 30 and the wiping region 32.

Here, as shown in FIG. 1 to FIG. 5, the supply portions 34A are disposed so as to not project from the wiping surface 20A in the wiping region 30, wiped by the wiper blade 24, of the front windshield glass 20. Furthermore, the supply portions 34A are disposed so as to not project from the wiping surface 20A in the wiping region 32, wiped by the wiper blade 26, of the front windshield glass 20. For this reason, the wiper blade 24 and the wiper blade 26 that are pivoted back and forth do not interfere with the supply portions 34A of the washer nozzle 34. Furthermore, the washer fluid can be directly supplied from the supply ports 24A1 of the supply portions 34A to the wiping region 30 and the wiping region 32, so the washer fluid is also not swept away by aerodynamic drag before landing in the wiping region 30 and the wiping region 32 and does not land outside the wiping region 30 and the wiping region 32.

Consequently, according to the vehicle window washer device 10 pertaining to the present exemplary embodiment, the washer fluid can be stably supplied to the wiping region 30 and the wiping region 32 without hindering the back and forth pivoting motion of the wiper blade 24 and the wiper blade 26.

Specifically, for example, in a case where washer nozzles are disposed in the engine hood 18 and the washer fluid is jetted onto the wiping region 30 and the wiping region 32, the washer fluid is affected by aerodynamic drag and also scatters outside the wiping region 30 and the wiping region 32, so that the amount of washer fluid supplied to the wiping region 30 and the wiping region 32 becomes reduced. In the vehicle window washer device 10 pertaining to the present exemplary embodiment, the washer fluid is directly supplied to the wiping region 30 and the wiping region 32, and the distance from the supply portions 34A to the wiping region 30 and the wiping region 32 becomes shorter, so the amount of washer fluid supplied to the wiping region 30 and the wiping region 32 is as set. Furthermore, because the amount of washer fluid supplied is stable, the efficiency with which the wiping region 30 and the wiping region 32 are cleaned can be improved. In other words, the cleaning efficiency can be improved and the amount of washer fluid used can be reduced.

Furthermore, in the vehicle window washer device 10 pertaining to the present exemplary embodiment, as shown in FIG. 1, FIG. 2, and FIG. 4, a plurality of the supply portions 34A of the washer nozzle 34 are placed along the longitudinal direction of the washer nozzle 34. For this reason, the washer fluid is supplied from the plural supply portions 34A to plural places on the wiper blade 24 and the wiper blade 26. Consequently, the vehicle window washer device 10 pertaining to the present exemplary embodiment can efficiently clean the wiping region 30 and the wiping region 32. In addition, the vehicle window washer device 10 pertaining to the present exemplary embodiment can also clean the rubber strip 24C itself of the wiper blade 24 and the rubber strip itself of the wiper blade 26.

Moreover, in the vehicle window washer device 10 pertaining to the present exemplary embodiment, as shown in FIG. 2 and FIG. 4, a plurality of the supply portions 34A are placed along the one reversal position (here, the lower reversal position) 30A of the wiper blade 24 that pivots back and forth in the wiping region 30. The supply portions 34A are placed in the same positions also in the wiping region 32. For this reason, it is difficult for the supply portions 34A to enter the field of view of an occupant when the occupant looks in the vehicle forward direction through the front windshield glass 20. Consequently, according to the vehicle window washer device 10 pertaining to the present exemplary embodiment, the field of view of the occupant can be well maintained.

Furthermore, in the vehicle window washer device 10 pertaining to the present exemplary embodiment, as shown in FIG. 1, FIG. 2, and FIG. 4, the supply portions 34A are placed on the wiping region 30 middle side of the one reversal position 30A (here, the lower reversal position) on the storage position P side of the wiper blade 24 in the wiping region 30. Likewise, as shown in FIG. 1, the supply portions 34A are placed on the wiping region 32 middle side of the one reversal position (the lower reversal position) on the storage position side of the wiper blade 26 in the wiping region 32. For this reason, the washer fluid can be supplied to the pivoting direction side of the wiper blade 24 and the wiper blade 26 soon after the wiper blade 24 and the wiper blade 26 start pivoting back and forth. Consequently, the vehicle window washer device 10 pertaining to the present exemplary embodiment can efficiently clean the wiping region 30 and the wiping region 32 soon after the wiper blade 24 and the wiper blade 26 start pivoting back and forth.

Moreover, as shown in FIG. 5, the vehicle window washer device 10 pertaining to the present exemplary embodiment is equipped with the wiper blade position detection sensor 54. The back and forth pivoting motion of the wiper blade 24 and the back and forth pivoting motion of the wiper blade 26 are performed in conjunction with each other, so the wiper blade position detection sensor 54 detects just the pivotal position of the wiper blade 24 in the wiping region 30. Specifically, the pivotal position is detected by the Hall element from the rotational position of the wiper motor when the wiper blade 24 has moved to the one reversal position 30A and the other reversal position 30B in the wiping region 30. The control unit 50 executes control that drives the washer pump 42 to supply the washer fluid from the supply portions 34A to each of the wiping region 30 and the wiping region 32.

Figure 6A:
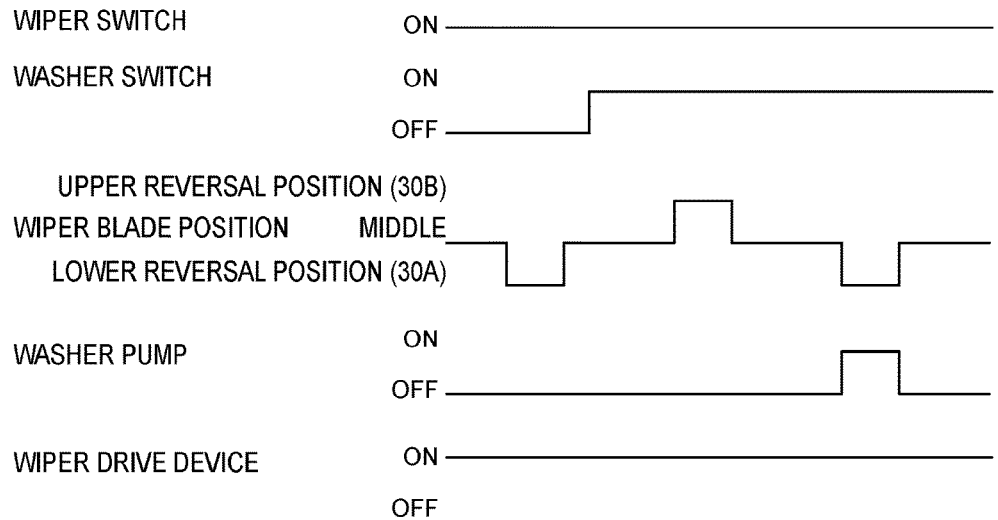
FIG. 6(A) is a timing chart describing the actions of the vehicle window washer device pertaining to the first exemplary embodiment when the wiper blade is activated.
Figure 6B:
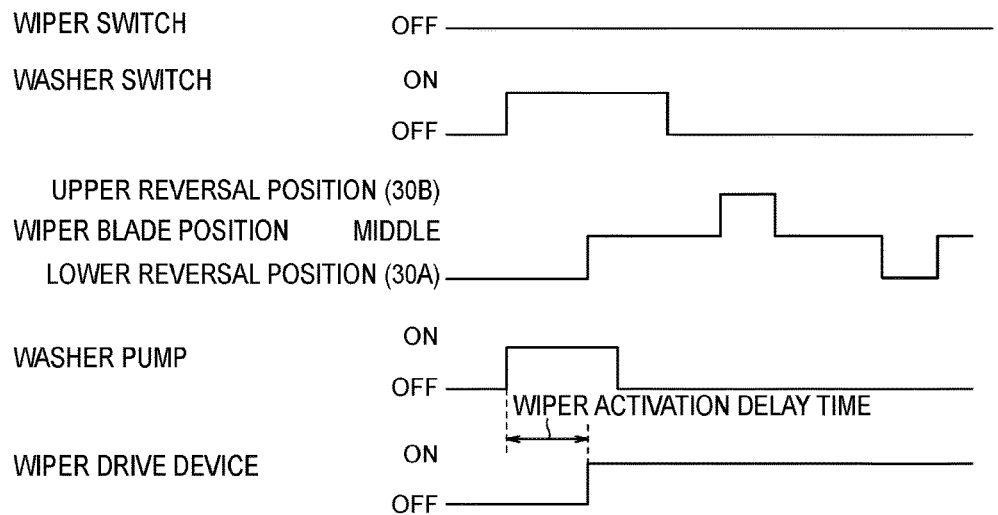
FIG. 6(B) is a timing chart describing the actions of the vehicle window washer device when the wiper blade is stopped.
Figure 7:
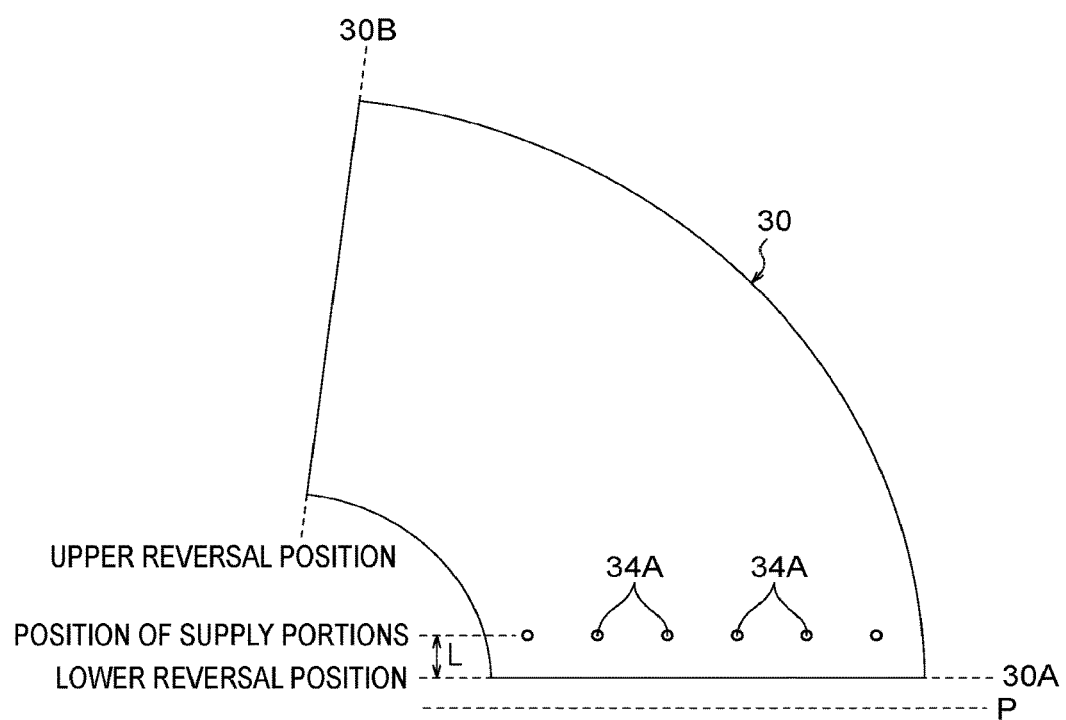
FIG. 7 is a schematic view describing placement positions of the supply portions of the washer nozzle with respect to the wiping region in the vehicle window washer device shown in FIG. 1.

Here, FIG. 6(A) shows the actions of the vehicle window washer device 10 when the wiper blade 24 is activated. Furthermore, FIG. 6(B) shows the actions of the vehicle window washer device 10 when the wiper blade 24 is stopped. Furthermore, FIG. 7 is a schematic view of the wiping region 30. As shown in FIG. 7, the plural supply portions 34A of the washer nozzle 34 are placed in the vehicle width direction along the one reversal position 30A of the wiping region 30 along the lower end portion of the front windshield glass 20. The placement of the supply portions 34A in the wiping region 32 is the same as the placement of the supply portions 34A in the wiping region 30.

As shown in FIG. 6(A), when the wiper switch 46 (see FIG. 5) is switched ON, the wiper drive device 52 is driven and the wiper blade 24 is pivoted back and forth between the one reversal position 30A and the other reversal position 30B. When the wiper blade 24 moves to the one reversal position 30A, the pivotal position of the wiper blade 24 is detected by the wiper blade position detection sensor 54 and this position information is sent to the control unit 50. Here, when the washer switch 48 is switched ON, the control unit 50 activates the washer pump 42 at the timing when the wiper blade 24 is moved to the one reversal position 30A and reverses direction. In other words, the control unit 50 activates the washer pump 42 when the wiper blade 24 has moved between (within a distance of separation L shown in FIG. 7) the one reversal position 30A and the supply portions 34A (when the wiper blade 24 is on the one reversal position 30A side of the supply portions 34A). Because of this activation, the washer fluid is supplied from the washer tank 40 to the washer nozzle 34, and is directly supplied from the supply ports 34A1 of the supply portions 34A to the wiping region 30. That is to say, the washer fluid is supplied to the pivoting direction side of the wiper blade 24 while the wiper blade 24 is moving from the one reversal position 30A toward the supply portions 34A. The action of supplying the washer fluid in the wiping region 32 is the same as the action of supplying the washer fluid in the wiping region 30, so description here will be omitted.

As shown in FIG. 6(B), when the wiper switch 46 is switched OFF and the wiper drive device 52 is stopped, the wiper blade 24 is stored in the storage position P. Here, when the washer switch 48 is switched ON, the control unit 50 activates the washer pump 42 to supply the washer fluid from the washer tank 42 to the washer nozzle 34. Because of this, the washer fluid is directly supplied from the supply ports 34A1 of the supply portions 34A to the wiping region 30. Additionally, the control unit 50 activates the wiper drive device 52 to pivot the wiper blade 24 after the elapse of a certain amount of time, for example, within a few seconds (the elapse of a wiper blade 24 activation delay time). The control unit 50 causes the wiper blade 24 to pivot back and forth one time to several times, for example.

In this way, on the basis of the result of the detection by the wiper blade position detection sensor 54 the control unit 50 executes control that drives the washer pump 42 to supply the washer fluid from the supply ports 34A1 of the supply portions 34A to the wiping region 30 just before the wiper blade 24 passes the supply portions 34A. For this reason, the washer fluid can be supplied to the pivoting direction side of the wiper blade 24 just before the wiper blade 24 passes the supply portions 34A in the wiping region 30. The washer fluid is also supplied to the pivoting direction side of the wiper blade 26 in the same way. Consequently, according to the vehicle window washer device 10 pertaining to the present exemplary embodiment, control that supplies the washer fluid to the wiping region 30 and the wiping region 32 soon after the pivoting motion of the wiper blade 24 and the wiper blade 26 can be realized.

In addition, in the vehicle window washer device 10, as shown in FIG. 5, the vehicle velocity sensor 56, the air temperature sensor 58, and the glass dirt sensor 44 are connected to the control unit 50. For this reason, the timing of the supply of the washer fluid can be appropriately adjusted by the control unit 50 on the basis of the environment information obtained by these various types of sensors. For example, when information indicating that the traveling velocity of the automobile 12 has exceeded a certain velocity has been sent from the vehicle velocity sensor 56 to the control unit 50, the control unit 50 lengthens the time in which the washer fluid is supplied to increase the amount of washer fluid supplied in consideration of the effect of aerodynamic drag. Furthermore, when, on the basis of the temperature information from the air temperature sensor 58, it is determined that the temperature is high, for example, the control unit 50 lengthens the time in which the washer fluid is supplied in consideration of the moisture evaporation amount of the washer fluid. Moreover, when, on the basis of the dirt information from the glass dirt sensor 44, it is determined that dirt is conspicuous, for example, the control unit 50 lengthens the time in which the washer fluid is supplied.

First Example Modification

Next, a vehicle window washer device 10 pertaining to a first example modification of the first exemplary embodiment will be described. Here, in the first example modification, example modifications following the first example modification, and other exemplary embodiments following the first exemplary embodiment, the same reference signs are assigned to constituent elements having the same functions as the constituent elements of the vehicle window washer device 10 pertaining to the first exemplary embodiment, and redundant description will be omitted.

As shown in FIG. 8(A) and FIG. 8(B), the vehicle window washer device 10 pertaining to the first example modification of the first exemplary embodiment is equipped with a washer nozzle 34 shaped like a four-sided tube having a closed longitudinal direction end portion. The cross-sectional shape of the washer nozzle 34 is rectangular, and the washer nozzle 34 is housed in the groove portion 20E of the front windshield glass 20 without any gap between them. Plural supply portions 34A are formed along the longitudinal direction of the washer nozzle 34 in the top wall portion on the vehicle outer side of the washer nozzle 34. The supply portions 34A are equipped with supply ports 34A1. The supply portions 34 are disposed so as to not project from the wiping surface 20A.

In the vehicle window washer device 10 pertaining to the first example modification, the cross-sectional shape of the washer nozzle 34 is the same rectangular shape as the cross-sectional shape of the groove portion 20E, so the washer nozzle 34 can be housed in the groove portion 20E of the front windshield glass 20 without any gap between them. Furthermore, the supply portions 34A are disposed so as to not project from the wiping surface 20A, so the wiper blade 24 and the wiper blade 26 that are pivoted back and forth do not interfere with the supply portions 34A.

Second Example Modification

Figure 9A:
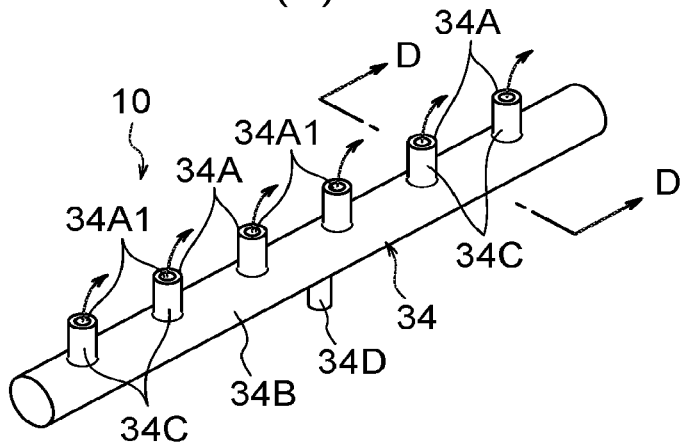
FIG. 9(A) is a perspective view of a washer nozzle of a vehicle window washer device pertaining to a second example modification of the first exemplary embodiment.
Figure 9B:
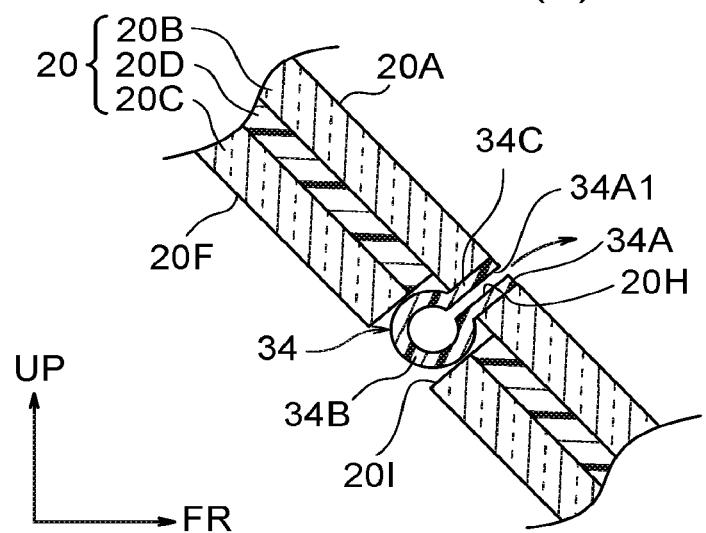
FIG. 9(B) is a sectional view (a sectional view cut along line D-D of FIG. 9(A)) of the washer nozzle shown in FIG. 9(A) and the windshield glass to which the washer nozzle is attached.
Figure 9C:
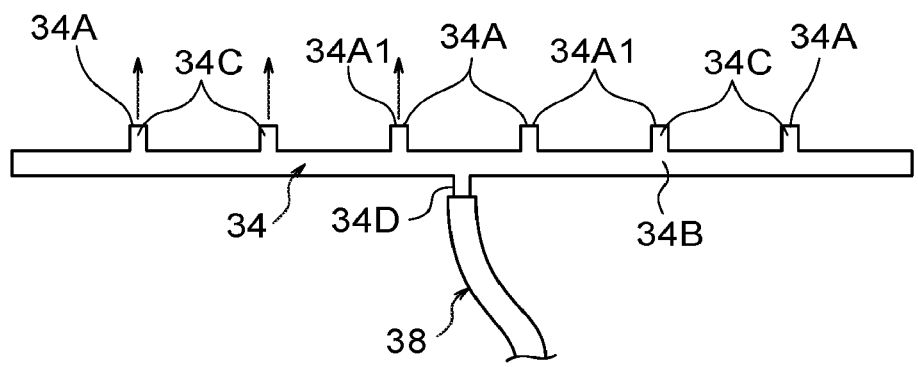
FIG. 9(C) is a front view, seen from the vehicle front side, of the washer nozzle shown in FIG. 9(A) and FIG. 9(B)

A vehicle window washer device 10 pertaining to a second example modification of the first exemplary embodiment is equipped with a washer nozzle 34 shown in FIG. 9(A) to FIG. 9(C). The washer nozzle 34 is configured to include a nozzle body 34B shaped like a circular tube having both longitudinal direction end portions closed, branching nozzle portions 34C, and supply portions 34A disposed in the upper ends of the branching nozzle portions 34C. The supply portions 34A are equipped with supply ports 34A1. The nozzle body 34B is placed in such a way that its longitudinal direction coincides with the vehicle width direction. A coupling portion 34D that projects downward is disposed in the middle of the bottom portion of the nozzle body 34B, and the hose 38 that supplies the washer fluid is connected to the coupling portion 34D (see FIG. 9(C)). The branching nozzle portions 34C are each formed in the shape of a cylinder that projects outward in the radial direction with respect to the nozzle body 34B from the top portion of the nozzle body 34B, and a plurality of the branching nozzle portions 34C are formed at regular intervals along the vehicle width direction. The nozzle body 34B and the branching nozzle portions 34C are integrally formed by resin molding, for example.

As shown in FIG. 9(B), a groove portion 201 whose longitudinal direction coincides with the vehicle width direction is disposed in the single plate glass 20C on the vehicle inner side of the front windshield glass 20 and the intermediate film 20D. The nozzle body 34B is housed in the groove portion 201. Additionally, a plurality of pores 20H reaching from the wiping surface 20A to the groove portion 201 are disposed at regular intervals along the vehicle width direction in the single plate glass 20B on the vehicle outer side of the front windshield glass 20. The branching nozzle portions 34C are inserted into the pores 20H. The supply portions 34A are disposed so as to not project from the wiping surface 20A like in the vehicle window washer device 10 pertaining to the first exemplary embodiment.

In the vehicle window washer device 10 pertaining to the second example modification, the nozzle body 34B of the washer nozzle 34 is disposed in the groove portion 201 on the vehicle inner side of the front windshield glass 20. For this reason, most of the washer nozzle 34 is protected from the external environment by the front windshield glass 20, so the life of the washer nozzle 34 can be lengthened.

Furthermore, in the vehicle window washer device 10 pertaining to the second example modification, the coupling portion 34D is disposed in the middle of the bottom portion of the nozzle body 34B of the washer nozzle 34. For this reason, the washer fluid can be evenly supplied from the middle of the nozzle body 34B to both longitudinal direction end sides, so the amount of time it takes for the washer fluid to be supplied from the supply portions 34A to the wiping region 30 and the wiping region 32 can be shortened.

Third Example Modification

Figure 11A:
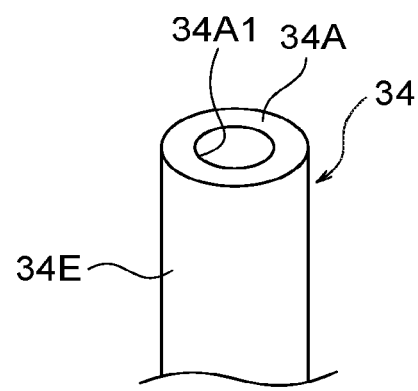
FIG. 11(A) is an enlarged perspective view of the nozzle shown in FIG. 10.
Figure 11B:
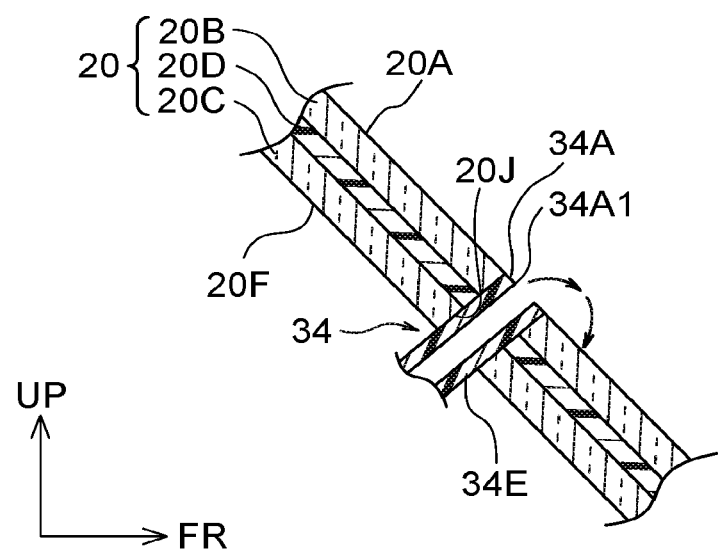
FIG. 11(B) is a sectional view, corresponding to FIG. 3(C), of the washer nozzle shown in FIG. 11(A) and the windshield glass to which the washer nozzle is attached.

In a vehicle window washer device 10 pertaining to a third example modification of the first exemplary embodiment, as shown in FIG. 10, a washer nozzle 34 is configured to include plural divided nozzle portions 34E placed at regular intervals along the vehicle width direction. As shown in FIG. 10, FIG. 11(A), and FIG. 11(B), in the third example modification, the divided nozzle portions 34E are each shaped like a cylinder set to the same diameter along its axial direction. Supply portions 34A are disposed in the upper ends of the divided nozzle portions 34E. The supply portions 34A are equipped with supply ports 34A1. The lower ends of the divided nozzle portions 34 serve as coupling portions (no reference sign is assigned thereto) and are connected to hoses 38 as shown in FIG. 10. Although it is not shown in the drawings, the hoses 38 are bundled together in the middle and connected to the washer pump 42 (see FIG. 1).

As shown in FIG. 11(B), a plurality of pores 20J running in the plate thickness direction through the single plate glass 20B on the vehicle outer side of the front windshield glass 20, the intermediate film 20D, and the single plate glass 20C on the vehicle inner side are formed at regular intervals along the vehicle width direction. The plural divided nozzle portions 34E are inserted into the plural pores 20J. The supply portions 34A are disposed so as to not project from the wiping surface 20A like in the vehicle window washer device 10 pertaining to the first exemplary embodiment.

In the vehicle window washer device 10 pertaining to the third example modification, the washer nozzle 34 is configured to include the divided nozzle portions 34E shaped like cylinders, and the divided nozzle portions 34E have a simple shape. For this reason, the washer nozzle 34 can be easily manufactured. Furthermore, the washer nozzle 34 can be inexpensively manufactured.

Fourth Example Modification

Figure 12A:
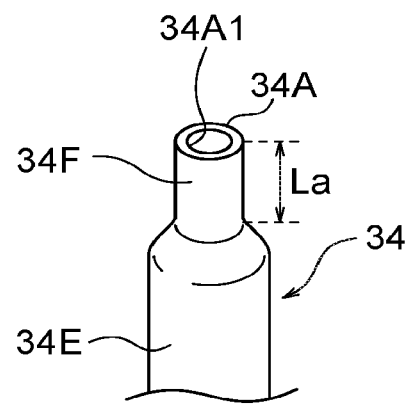
FIG. 12(A) is an enlarged perspective view, corresponding to FIG. 11(A), of a washer nozzle of a vehicle window washer device pertaining to a fourth example modification of the first exemplary embodiment.
Figure 12B:
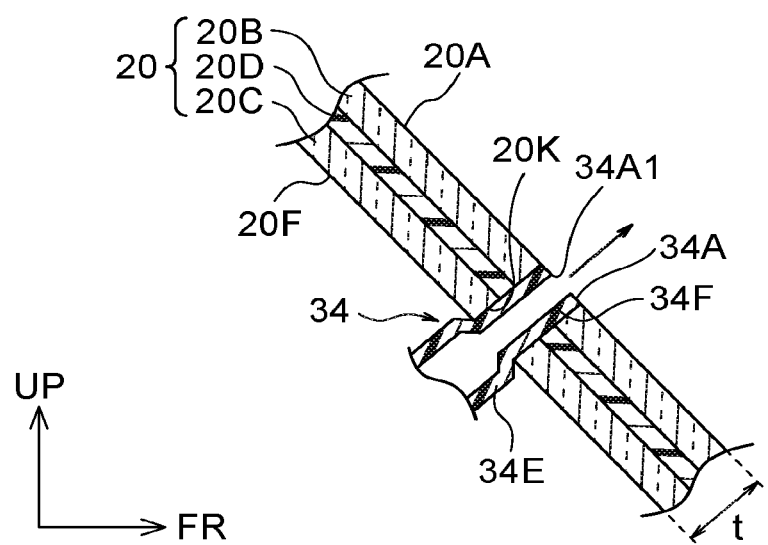
FIG. 12(B) is a sectional view, corresponding to FIG. 11(B), of the washer nozzle shown in FIG. 12(A) and the windshield glass to which the washer nozzle is attached.

A vehicle window washer device 10 pertaining to a fourth example modification of the first exemplary embodiment is an example application of the vehicle window washer device 10 pertaining to the third example modification. As shown in FIG. 12(A) and FIG. 12(B), upper portions 34F on the vehicle outer side of the divided nozzle portions 34E of the washer nozzle 34 are narrower in diameter than the lower portions on the vehicle inner side. The supply portions 34A are disposed in the upper ends of the upper portions 34F that are narrow in diameter. The supply portions 34A are equipped with the supply ports 34A1.

Pores 20K that are narrower in diameter than the pores 20J and correspond to the upper portions 34F of the divided nozzle portions 34E are disposed in the front windshield glass 20. The upper portions 34F are inserted into the pores 20K. In the fourth example modification, an axial direction length La of the upper portions 34F of the divided nozzle portions 34E is the same as a thickness t of the front windshield glass 20.

In the vehicle window washer device 10 pertaining to the fourth example modification, the upper portions 34F of the divided nozzle portions 34E of the washer nozzle 34 are narrow in diameter, so the supply pressure of the washer fluid in the supply portions 34A can be increased. For this reason, the washer fluid can be jetted to positions away from the supply portions 34A, so the supply range of the washer fluid in the wiping region 30 and the wiping region 32 can be enlarged.

Furthermore, in the vehicle window washer device 10 pertaining to the fourth example modification, the axial direction length La of the upper portions 34F of the divided nozzle portions 34E and the thickness t of the front windshield glass 20 are the same. For this reason, by simply inserting the upper portions 34F into the pores 20K, the positions of the supply portions 34A of the washer nozzle 34 can be made to coincide with the wiping surface 20A of the front windshield glass 20. It should be noted that by shortening the axial direction length La of the upper portions 34F of the divided nozzle portions 34E, the positions of the supply portions 34A can easily be made lower in the front windshield glass 20 than the wiping surface 20A.

Fifth Example Modification

A vehicle window washer device 10 pertaining to a fifth example modification of the first exemplary embodiment is an example application of the vehicle window washer device 10 pertaining to the second example modification. As shown in FIG. 13, the washer nozzle 34 of the vehicle window washer device 10 pertaining to the fifth example modification is configured to include the nozzle body 34B, the branching nozzle portions 34C, and the supply portions 34A disposed in the upper ends of the branching nozzle portions 34C. The supply portions 34A are equipped with the supply ports 34A1. In the fifth example modification, the nozzle body 34B is shaped like a semicircular cylinder in which the upper half of a circular cylinder has been removed, and both longitudinal direction end portions of the nozzle body 34B are closed. Additionally, the plural divided nozzle portions 34C are disposed projecting from the flat top wall portion of the nozzle body 34B.

In the vehicle window washer device 10 pertaining to the fifth example modification, the same action and effects as the action and effects obtained by the vehicle window washer device 10 pertaining to the second example modification can be obtained.

Furthermore, in the vehicle window washer device 10 pertaining to the fifth example modification, the nozzle body 34B of the washer nozzle 34 is shaped like a semicircular cylinder having a flat top wall portion. For this reason, the top wall portion and the surface 20F of the front windshield glass 20 (see FIG. 9(B)) come into flat contact with each other, so stability when the washer nozzle 34 has been attached to the front windshield glass 20 can be improved.

Second Exemplary Embodiment

A vehicle window washer device 10 pertaining to a second exemplary embodiment of the present invention will be described using FIG. 14 to FIG. 16.

(Configuration of the Vehicle Window Washer Device 10)

As shown in FIG. 14(A) to FIG. 14(D), the vehicle window washer device 10 pertaining to the present exemplary embodiment is equipped with a jet nozzle type washer nozzle 64. The washer nozzle 64 is configured to include a nozzle body 64B, a movable nozzle portion 64D disposed in the upper portion of the nozzle body 64B, and a supply portion 64A disposed in the movable nozzle portion 64D. The supply portion 64 is equipped with a supply port 64A1. The nozzle body 64B is formed in the shape of a cylinder that can supply the washer fluid along its axial direction. A nozzle retention portion 64C that is shaped like a sphere having a recess and movably retains the movable nozzle portion 64D in the upper portion of the nozzle body 64B is formed integrally with the nozzle body 64B.

Figure 14A:
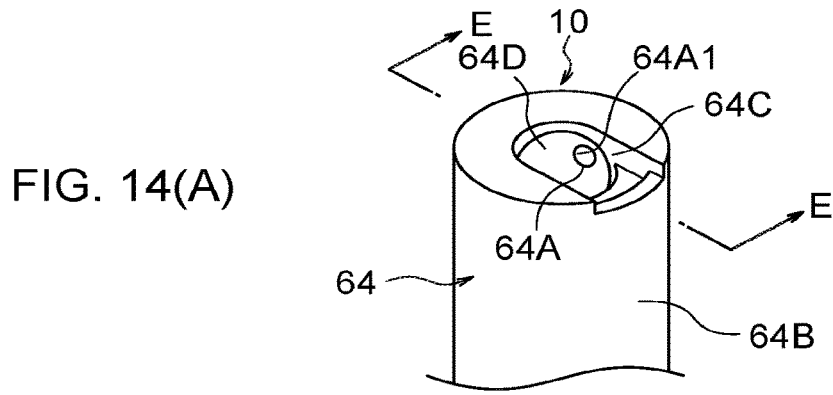
FIG. 14(A) is a perspective view of a washer nozzle of a vehicle window washer device pertaining to a second exemplary embodiment.
Figure 14B:
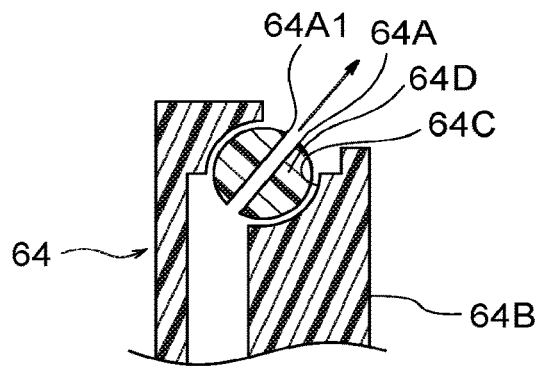
FIG. 14(B) is a sectional view (a sectional view cut along line E-E of FIG. 14(A)) of the washer nozzle shown in FIG. 14(A)
Figure 14C:
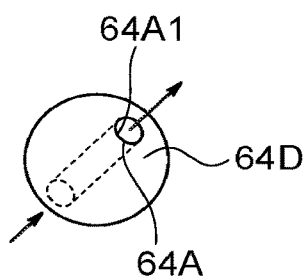
FIG. 14(C) is a perspective view of a constituent part of the washer nozzle shown in FIG. 14(A) and FIG. 14(B)
Figure 14D:
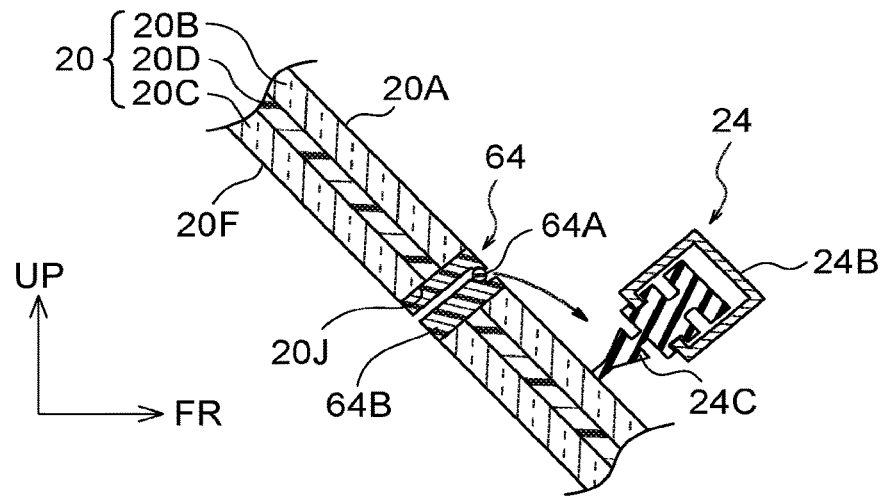
FIG. 14(D) is a perspective view, corresponding to FIG. 3(C), of the washer nozzle shown in FIG. 14(A) and FIG. 14(B) and the windshield glass to which the washer nozzle is attached.

The movable nozzle portion 64D is formed in the shape of a sphere, has a through hole running through its central portion, and is equipped, on the vehicle outer side of the through hole, with the supply portion 64A that supplies the washer fluid to the wiping region 30 and the wiping region 32. It should be noted that although FIG. 14(B) shows a gap disposed between the movable nozzle portion 64D and the nozzle retention portion 64C in order to make it easier to understand the configurations of each, in actuality the movable nozzle portion 64D is fitted into the nozzle retention portion 64C, and the movable nozzle portion 64D slides with a moderate frictional force with respect to the nozzle retention portion 64C. That is, the movable nozzle portion 64D is movably retained in the nozzle retention portion 64C, and the direction the supply portion 64A faces can be manually changed. The supply portion (through hole) 64A is set to a smaller flow path cross section than the flow path cross section of the washer fluid supply flow path in the nozzle body 64B. For this reason, the supply pressure of the washer fluid can be increased in the supply portion 64A.

The washer nozzle 64 is inserted into a pore 20J disposed running through the front windshield glass 20. The positions of the supply portion 64A of the washer nozzle 64 and the upper end of the nozzle body 64B are disposed so as to not project from the wiping surface 20A of the front windshield glass 20 like in the vehicle window washer device 10 pertaining to the first exemplary embodiment. It should be noted that the configurations of the vehicle window washer device 10 other than that of the washer nozzle 64 are the same as the configurations of the vehicle window washer device 10 pertaining to the first exemplary embodiment.

(Action and Effects of the Present Exemplary Embodiment)

In the vehicle window washer device 10 pertaining to the present exemplary embodiment, the washer nozzle 64 is equipped with the movable nozzle portion 64D having the supply portion 64A, and the direction the supply portion 64A faces can be changed by moving the movable nozzle portion 64D with respect to the nozzle body 64B. For this reason, the direction in which the washer fluid is supplied can be adjusted in each of the wiping region 30 and the wiping region 32 shown in FIG. 1 so that the cleaning efficiency can be improved.

Furthermore, in the vehicle window washer device 10 pertaining to the present exemplary embodiment, the washer nozzle 64 is a jet nozzle type, so the washer fluid can be supplied to places away from the supply portion 64A in each of the wiping region 30 and the wiping region 32. Consequently, the washer fluid can be jetted and supplied toward places whose cleaning efficiency can be improved, such as, for example, the rubber strip 24C of the wiper blade 24 and the rubber strip of the wiper blade 26 just before they pass the supply portion 64A.

First Example Modification

A vehicle window washer device 10 pertaining to a first example modification of the second exemplary embodiment is equipped with a movable nozzle portion 64E shown in FIG. 15(A) to FIG. 15(C) instead of the movable nozzle portion 64D of the washer nozzle 64 of the vehicle window washer device 10 pertaining to the second exemplary embodiment. Like the movable nozzle portion 64D, the movable nozzle portion 64E is shaped like a sphere and is fitted into and movably retained by the nozzle retention portion 64C. A plurality (here, two) of the supply portions 64A are disposed in the movable nozzle portion 64E. The supply portions 64A are equipped with supply ports 64A1. That is, there is more than one direction in which the washer fluid is supplied, and the washer fluid can be supplied in multiple directions in each of the wiping region 30 and the wiping region 32.

In the vehicle window washer device 10 pertaining to the first example modification, the plural supply portions 64A are disposed in the movable nozzle portion 64E of the washer nozzle 64, so the supply range of the washer fluid can be enlarged to improve the cleaning efficiency in each of the wiping region 30 and the wiping region 32.

Second Example Modification

Figure 16A:
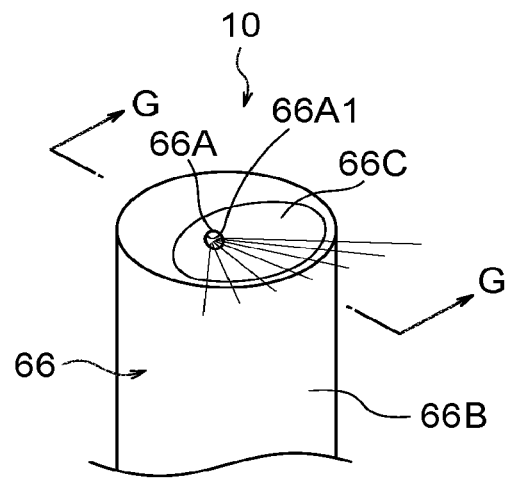
FIG. 16(A) is a perspective view of a washer nozzle of a vehicle window washer device pertaining to a second example modification of the second exemplary embodiment.
Figure 16B:
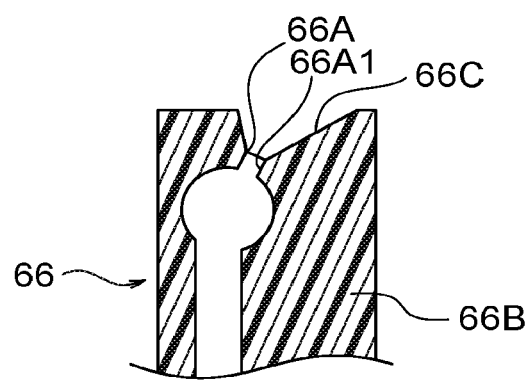
FIG. 16(B) is a sectional view (a sectional view cut along line G-G of FIG. 16(A)) of the washer nozzle shown in FIG. 16(A)

A vehicle window washer device 10 pertaining to a second example modification of the second exemplary embodiment is equipped with a spray type (diffusion type) washer nozzle 66 shown in FIG. 16(A) and FIG. 16(B) instead of the washer nozzle 64 of the vehicle window washer device 10 pertaining to the second exemplary embodiment. The washer nozzle 66 is configured to include a nozzle body 66B shaped like a cylinder that can supply the washer fluid along the axial direction and a supply portion 66A disposed in the upper portion of the nozzle body 66B. The supply portion 66A is equipped with a supply port 66A1. The supply port 66A1 is an orifice and diffuses the washer fluid. A diffusion guide portion 66C that increases in diameter in an inverted conical shape heading from the supply portion 66A toward the vehicle outer side is disposed in the top wall portion of the nozzle body 66B. The diffusion guide portion 66C regulates the direction in which the washer fluid is diffused.

In the vehicle window washer device 10 pertaining to the second example modification, the spray type washer nozzle 66 is disposed, so the washer fluid can be evenly diffused to enlarge the supply range and improve the cleaning efficiency in each of the wiping region 30 and the wiping region 32.

Third Exemplary Embodiment

A vehicle window washer device 10 pertaining to a third exemplary embodiment of the present invention will be described using FIG. 17 to FIG. 21.

(Configuration of the Vehicle Window Washer Device 10)

Figure 17A:
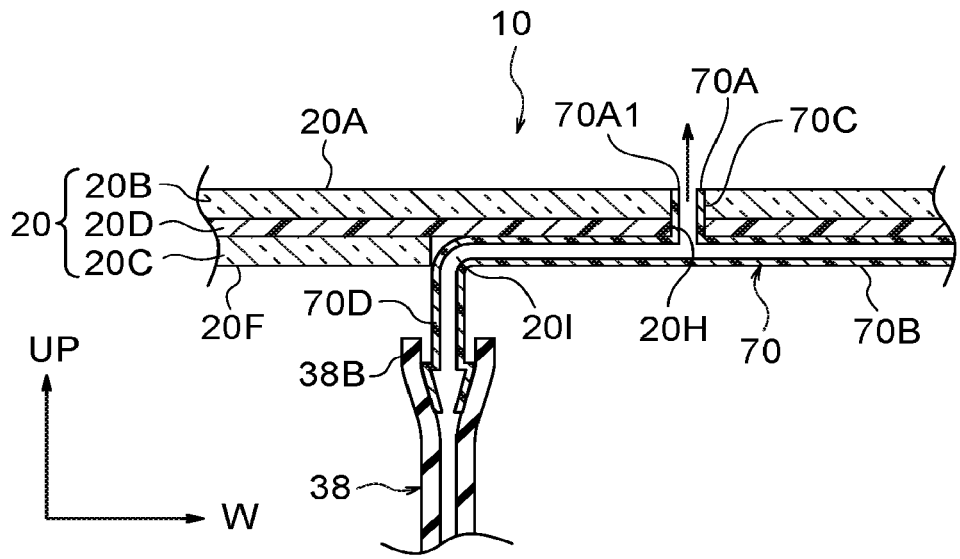
FIG. 17(A) is a sectional view, corresponding to FIG. 3(B), of the front windshield glass to which a washer nozzle of a vehicle window washer device pertaining to a third exemplary embodiment is attached.
Figure 17B:
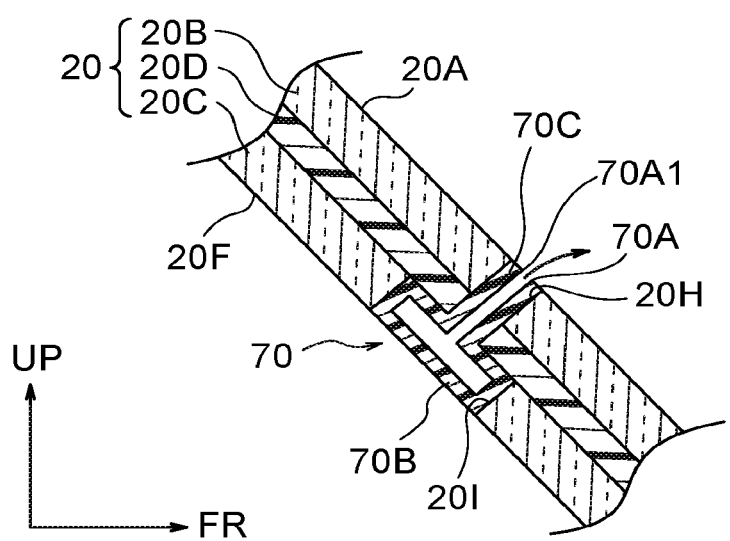
FIG. 17(B) is a sectional view, corresponding to FIG. 3(C), of the front windshield glass.

As shown in FIG. 17(A) and FIG. 17(B), the vehicle window washer device 10 pertaining to the present exemplary embodiment is equipped with a washer nozzle 70. Like the washer nozzle 34 shown in FIG. 9(A) to FIG. 9(C), the washer nozzle 70 is configured to include a nozzle body 70B, branching nozzle portions 70C, and supply portions 70A disposed in the upper ends of the branching nozzle portions 70C. The supply portions 70A are equipped with supply ports 70A1. The nozzle body 70B is formed in the shape of a long and narrow four-sided tube whose longitudinal direction extends along the vehicle width direction. One end portion of the nozzle body 70B is bent downward and formed as a coupling portion 70D. Another end portion 38B of the hose 38 is connected to the coupling portion 70D. The branching nozzle portions 70C are each formed in the shape of a cylinder that projects in a direction orthogonal to the nozzle body 70B from the top portion of the nozzle body 70B, and a plurality of the branching nozzle portions 70C are formed in regular intervals along the vehicle width direction. The nozzle body 70B and the branching nozzle portions 70C are integrally formed by resin molding, for example.

A groove portion 201 whose longitudinal direction coincides with the vehicle width direction is disposed in the single plate glass 20C on the vehicle inner side of the front windshield glass 20. The nozzle body 70B is housed in the groove portion 201. The cross-sectional shape of the groove portion 201 in its transverse direction is rectangular, and the cross-sectional shape of the nozzle body 70B in the same direction is also rectangular. Consequently, the nozzle body 70B can be housed in the groove portion 201 without any gap between them. Additionally, a plurality of pores 20H reaching from the wiping surface 20A to the groove portion 201 are disposed at regular intervals along the vehicle width direction in the single plate glass 20B on the vehicle outer side of the front windshield glass 20 and the intermediate film 20D. The branching nozzle portions 70C are inserted into the pores 20H. The supply portions 70A are disposed so as to not project from the wiping surface 20A like in the vehicle window washer device 10 pertaining to the first exemplary embodiment.

(Action and Effects of the Present Exemplary Embodiment)

In the vehicle window washer device 10 pertaining to the present exemplary embodiment, the same action and effects as the action and effects obtained by the vehicle window washer device 10 pertaining to the first exemplary embodiment can be obtained.

Furthermore, in the vehicle window washer device 10 pertaining to the present exemplary embodiment, the nozzle body 70B of the washer nozzle 70 is disposed in the groove portion 201 on the vehicle inner side of the front windshield glass 20. For this reason, most of the washer nozzle 70 is protected from the external environment by the front windshield glass 20, so the life of the washer nozzle 70 can be lengthened.

First Example Modification

Figure 18:
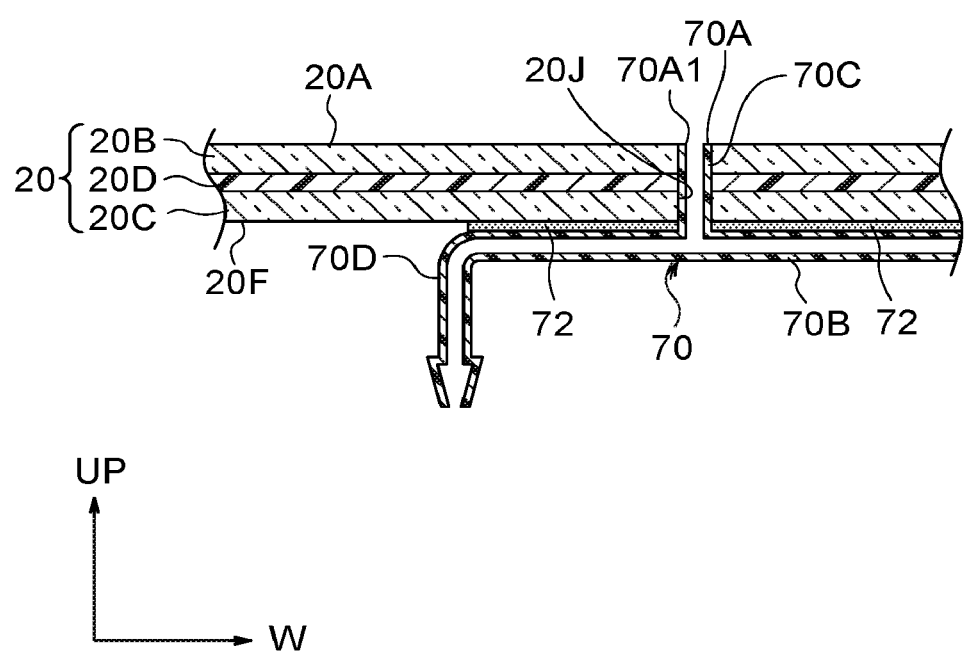
FIG. 18 is a sectional view, corresponding to FIG. 17(A), of the front windshield glass to which a washer nozzle of a vehicle window washer device pertaining to a first example modification of the third exemplary embodiment is attached.

As shown in FIG. 18, a vehicle window washer device 10 pertaining to a first example modification of the third exemplary embodiment is equipped with a washer nozzle 70 that is substantially the same as that of the vehicle window washer device 10 pertaining to the third exemplary embodiment. The washer nozzle 70 is attached to the surface 20F on the vehicle inner side of the front windshield glass 20. The attachment is performed by adhering the nozzle body 70B of the washer nozzle 70 via an adhesive 72 to the surface 20F of the single plate glass 20C. A resin adhesive, for example, is used as the adhesive 72. Furthermore, double-sided adhesive tape can also be used instead of the adhesive 72. The branching nozzle portions 70C of the washer nozzle 70 are inserted into pores 20J formed in the front windshield glass 20.

In the vehicle window washer device 10 pertaining to the first example modification, the nozzle body 70B of the washer nozzle 70 is adhered via the adhesive 72 to the surface 20F on the vehicle inner side of the front windshield glass 20. For this reason, the washer nozzle 70 is easily attached by the adhesive 72 to the surface 20F, and it suffices to perform the simple work of forming in the front windshield glass 20 the pores 20J for inserting the branching nozzle portions 70C of the washer nozzle 70, so the structure of the vehicle window washer device 10 can be simplified.

Second Example Modification

Figure 19A:
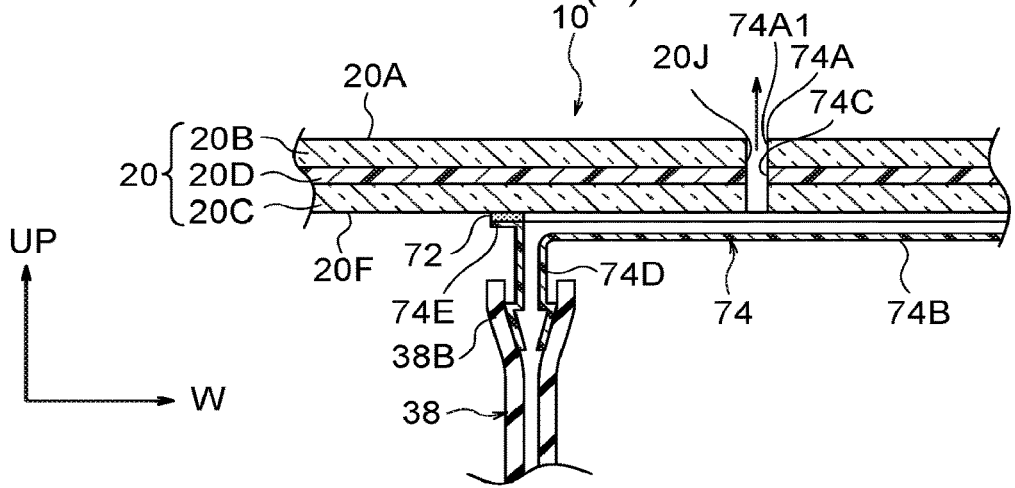
FIG. 19(A) is a sectional view, corresponding to FIG. 17(A), of the front windshield glass to which a washer nozzle of a vehicle window washer device pertaining to a second example modification of the third exemplary embodiment is attached.
Figure 19B:
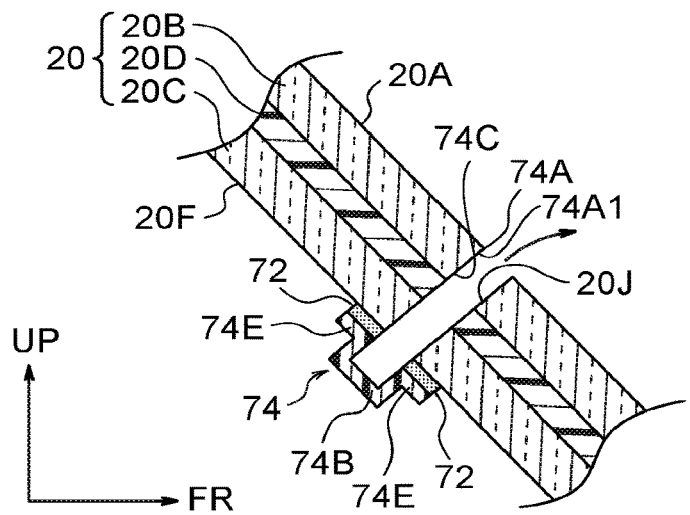
FIG. 19(B) is a sectional view, corresponding to FIG. 17(B), of the front windshield glass.
Figure 19C:
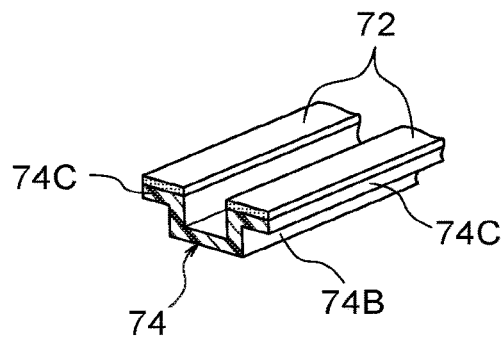
FIG. 19(C) is a perspective view of a main part of the washer nozzle shown in FIG. 19(A) and FIG. 19(B)

As shown in FIG. 19(A) to FIG. 19(C), a vehicle window washer device 10 pertaining to a second example modification of the third exemplary embodiment is equipped with a washer nozzle 74. The washer nozzle 74 is configured to include a nozzle constituent part 74B, branching nozzle portions 74C formed utilizing pores 20J in the front windshield glass 20, and supply portions 74A disposed in the upper ends of the branching nozzle portions 74C and utilizing as supply ports 74A1 the openings of the pores 20J. The nozzle constituent part 74B is placed in such a way that its longitudinal direction extends along the vehicle width direction, and the cross-sectional shape of the nozzle constituent part 74B in its transverse direction is formed in the shape of a square U that opens to the surface 20F side of the front windshield glass 20. Flange portions 74E that spread outward are formed integrally with the nozzle constituent part 74B on the peripheral edge of the opening of the nozzle constituent part 74B. The flange portions 74E are adhered to the surface 20F via an adhesive 72, and the nozzle constituent part 74B forms between itself and the surface 20F a closed flow path for supplying the washer fluid in the vehicle width direction. A coupling portion 74D that projects downward and is integrally formed is disposed on one end portion of the nozzle constituent part 74B, and the coupling portion 74D is connected to another end portion 38B of the hose 38. A plurality of the branching nozzle portions 74C (the pores 20J) are formed at regular intervals in the vehicle width direction, and the plural branching nozzle portions 74C are each connected to the nozzle constituent part 74B.

In the vehicle window washer device 10 pertaining to the second example modification, the washer nozzle 74 is configured utilizing the surface 20F on the vehicle inner side of the front windshield glass 20 and the pores 20J. Specifically, by forming the pores 20J in the front windshield glass 20 and adhering the nozzle constituent part 74B to the surface 20F of the front windshield glass 20, the washer nozzle 74 can be configured using the surface 20F and the pores 20J as some of its constituent elements. For this reason, the vehicle window washer device 10 can be given a simple structure.

Third Example Modification

Figure 20:
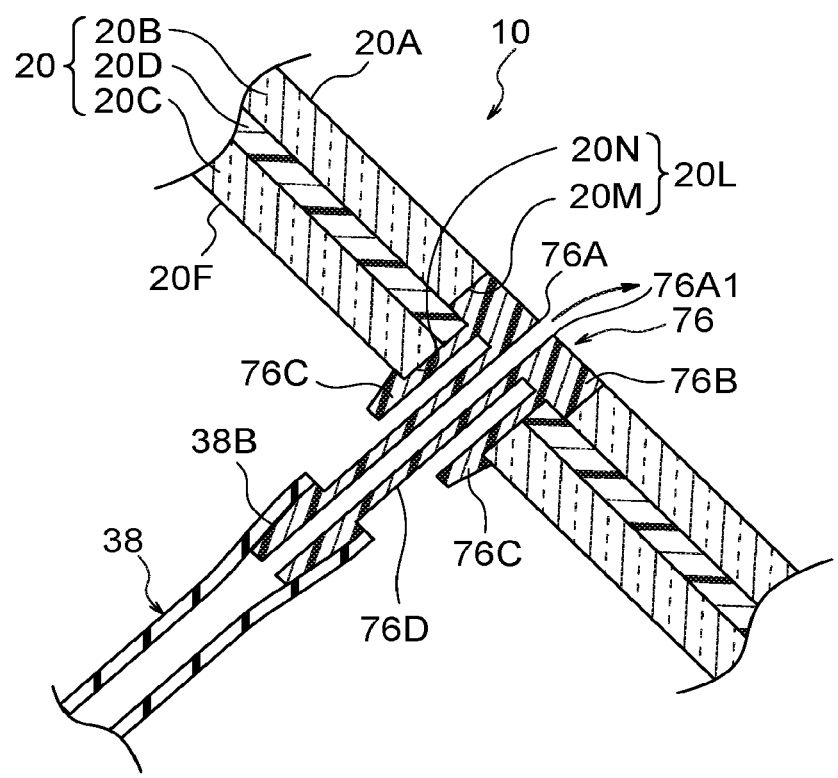
FIG. 20 is a sectional view, corresponding to FIG. 17(B), of the front windshield glass to which a washer nozzle of a vehicle window washer device pertaining to a third example modification of the third exemplary embodiment is attached.

As shown in FIG. 20, a vehicle window washer device 10 pertaining to a third example modification of the third exemplary embodiment is equipped with a washer nozzle 76. The washer nozzle 76 is configured to include a nozzle body 76B, a supply portion 76A disposed on the vehicle outer side of the nozzle body 76B, a coupling portion 76D disposed on the vehicle inner side of the nozzle body 76B, and anchoring portions 76C. The supply portion 76A is equipped with a supply port 76A1. One washer nozzle 76 is placed in each of the wiping region 30 and the wiping region 32, or a plurality of the washer nozzles 76 are placed at regular intervals in the vehicle width direction in each of the wiping region 30 and the wiping region 32. The nozzle body 76B has the same thickness as, or is a little thinner than, the plate thickness of the single plate glass 20B of the front windshield glass 20 and is formed as a plate-like member formed in the shape of a disc, an ellipse, or a rectangle as seen from the vehicle front side. A washer fluid flow path (no reference sign is assigned thereto) running in the plate thickness direction is formed in the central portion of the nozzle body 76B, and the vehicle outer side end of the flow path serves as the supply portion 76A. The washer fluid is supplied from the supply port 76A1 of the supply portion 76A to each of the wiping region 30 and the wiping region 32. An open portion 20M in which the nozzle body 76B is housed is formed in the single plate glass 20B on the vehicle outer side of the front windshield glass 20.

In the front windshield glass 20, an open portion 20N that is formed in the single plate glass 20C and the intermediate film 20D and is narrower in diameter than the open portion 20M is formed in a position corresponding to the open portion 20M. The open portion 20M and the open portion 20N are communicated with each other to form a nozzle retention hole 20L having a step formed by the difference in diameters in the plate thickness direction middle portion. The coupling portion 76D is erectly disposed in the same direction as the plate thickness direction of the front windshield glass 20 from the central portion on the vehicle inner side of the nozzle body 76B toward the open portion 20N side. One end portion on the vehicle outer side of the coupling portion 76B is coupled to the supply portion 76A. Another end portion 38B of the hose 38 is connected to another end portion on the vehicle inner side of the coupling portion 76D.

Additionally, the anchoring portions 76C are configured as claws that are flexible, extend along the inner wall of the open portion 20N from the nozzle body 76B, and catch on the surface 20F. The anchoring portions 76C sandwich the single plate glass 20C and the intermediate film 20D between themselves and the nozzle body 76B to thereby anchor the washer nozzle 76 to the front windshield glass 20. It should be noted that each portion of the washer nozzle 76 is integrally formed using a resin material or a metal material, for example.

In the vehicle window washer device 10 pertaining to the third example modification, the washer nozzle 76 is equipped with the anchoring portions 76C. For this reason, the washer nozzle 76 can be quickly attached to the front windshield glass 20 by inserting the washer nozzle 76 into the nozzle retention hole 20L in the front windshield glass 20 and anchoring the anchoring portions 76C to the surface 20F. Consequently, the efficiency of the work of attaching the vehicle window washer device 10 can be improved.

Fourth Example Modification

Figure 21:
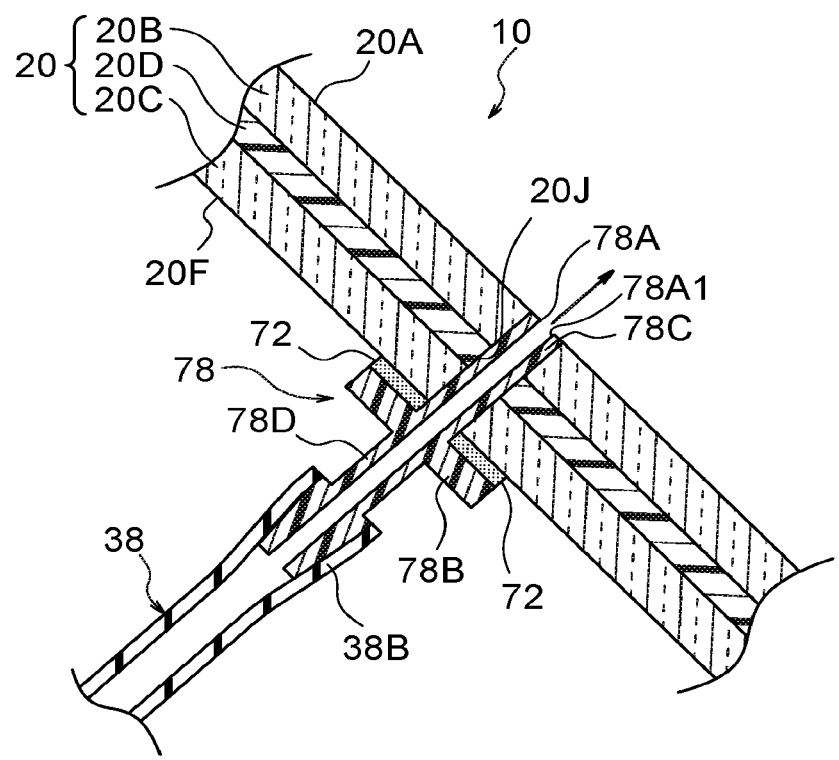
FIG. 21 is a sectional view, corresponding to FIG. 20, of the front windshield glass to which a washer nozzle of a vehicle window washer device pertaining to a fourth example modification of the third exemplary embodiment is attached.

As shown in FIG. 21, a vehicle window washer device 10 pertaining to a fourth example modification of the third exemplary embodiment is equipped with a washer nozzle 78. The washer nozzle 78 is configured to include a nozzle body 78B, a nozzle portion 78C that projects from the nozzle body 78B toward the vehicle outer side, a supply portion 78A disposed on the vehicle outer side end of the nozzle portion 78C, and a coupling portion 78D disposed projecting from the nozzle body 78B toward the vehicle inner side. The supply portion 78A is equipped with a supply port 78A1.

Like the washer nozzle 76 in the third example modification, one washer nozzle 78 or a plurality of the washer nozzles 78 are placed in each of the wiping region 30 and the wiping region 32. The nozzle body 78B is formed by a plate-like member having a disc shape, for example, whose plate thickness coincides with the same direction as the plate thickness direction of the front windshield glass 20. The nozzle body 78B is adhered using an adhesive 72 to the surface 20F of the front windshield glass 20. Double-sided adhesive tape can be used instead of the adhesive 72. The nozzle portion 78C is inserted into a pore 20J formed in the front windshield glass 20. The coupling portion 78D is connected to another end portion 38B of the hose 38. It should be noted that each portion of the washer nozzle 78 is integrally formed using a resin material or a metal material, for example.

In the vehicle window washer device 10 pertaining to the fourth example modification, the nozzle body 78B of the washer nozzle 78 is adhered via the adhesive 72 to the surface 20F on the vehicle inner side of the front windshield glass 20. For this reason, the washer nozzle 78 is easily attached to the surface 20F by the adhesive 72, and it suffices to perform the simple work of forming in the front windshield glass 20 the pore 20J for inserting the nozzle portion 78C of the washer nozzle 78, so the structure of the vehicle window washer device 10 can be simplified.

Fourth Exemplary Embodiment

A vehicle window washer device 10 pertaining to a fourth exemplary embodiment of the present invention will be described using FIG. 22 to FIG. 24.

(Configuration of the Vehicle Window Washer Device 10)

Figure 22:
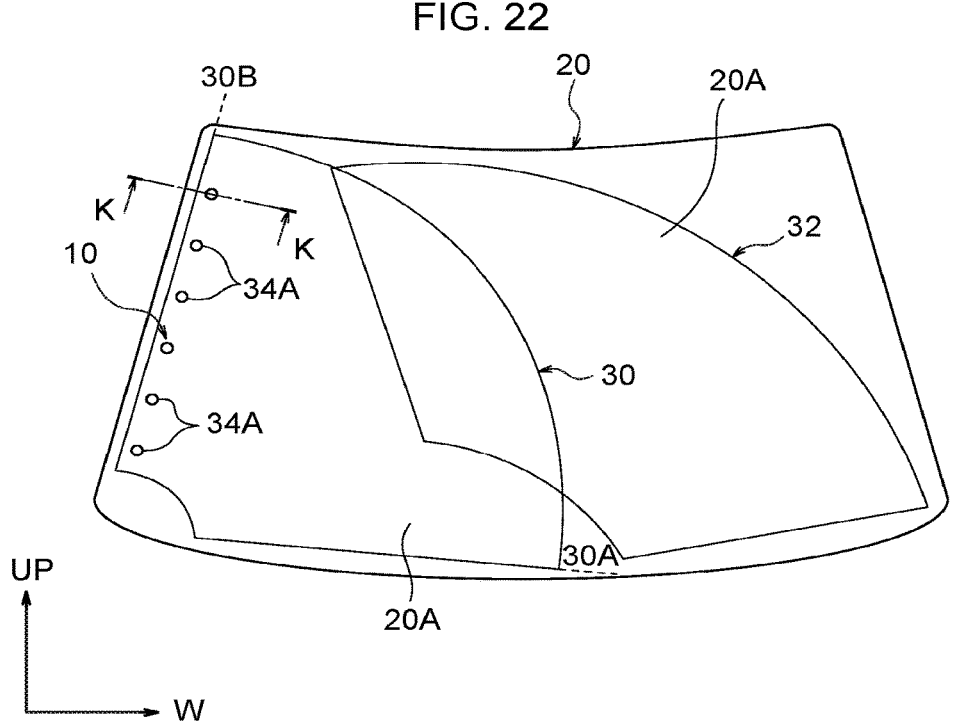
FIG. 22 is a schematic view of the front windshield glass and the wiping regions thereof and describes placement positions of supply portions of a washer nozzle of a vehicle window washer device pertaining to a fourth exemplary embodiment.
Figure 23:
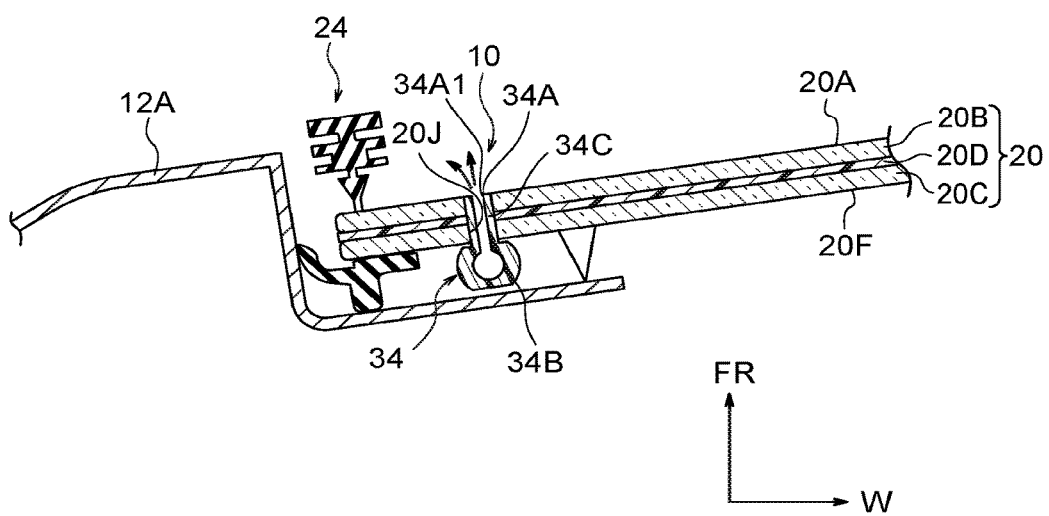
FIG. 23 is a sectional view (a sectional view cut along line K-K of FIG. 22) of the front windshield glass and the washer nozzle shown in FIG. 22 and a front pillar.

As shown in FIG. 22, in the vehicle window washer device 10 pertaining to the present exemplary embodiment, a plurality of supply portions 34A of a washer nozzle 34 are disposed at regular intervals in the vehicle up and down direction along the other reversal position (the upper reversal position) 30B of the wiping region 30. Specifically, as shown in FIG. 22 and FIG. 23, the supply portions 34A are placed along the front pillar 12A, on the left side end portion of the front windshield glass 20 as seen from the vehicle front side. As shown in FIG. 23, like the washer nozzle 34 of the vehicle window washer device 10 pertaining to the second example modification of the first exemplary embodiment, the washer nozzle 34 is configured to include a nozzle body 34B, branching nozzle portions 34C, and supply portions 34A on the vehicle outer side ends of the branching nozzle portions 34C. The branching nozzle portions 34C are inserted into pores 20J running through the front windshield glass 20. The supply portions 34A are disposed so as to not project from the wiping surface 20A of the front windshield glass 20. The washer nozzle 34 is connected to the washer pump 42 (see FIG. 1) via the hose 38, which is not shown in FIG. 22 and FIG. 23.

The vehicle window washer device 10 pertaining to the present exemplary embodiment is equipped with the same system configuration as the system configuration, shown in FIG. 5, of the vehicle window washer device 10 pertaining to the first exemplary embodiment and acts in accordance with the same sequence of actions as the sequence of actions shown in FIG. 6(A) and FIG. 6(B). The system configuration and the sequence of actions are such that, for example, the washer fluid is supplied from the supply ports 34A1 of the supply portions 34 just before the wiper blade 24 reversing direction at the other reversal position 30B and pivoting toward the middle of the wiping region 30 passes the supply portions 34A.

Furthermore, in the vehicle window washer device 10 pertaining to the present exemplary embodiment, as shown in FIG. 22, the supply portions 34A are disposed on the other reversal position 30B side of the wiping region 30, but the supply portions 34A are not disposed on the other reversal position (the upper reversal position) side of the wiping region 32. The other reversal position of the wiping region 32 is positioned right in front of the occupant (the driver) in the vehicle forward direction, so by not disposing the supply portions 34A along the other reversal position the field of view of the occupant in the vehicle forward direction can be well maintained. It should be noted that, because the middle portion of the wiping region 30 and the other reversal position of the wiping region 32 coincide with each other, some of the washer fluid supplied from the supply portions 34A to the wiping region 30 is also supplied to the wiping region 32.

In the vehicle window washer device 10 pertaining to each exemplary embodiment from the first exemplary embodiment to the present exemplary embodiment, the wiper blade 24 and the wiper blade 26 pivot back and forth between the lower end portion and the left side end portion of the front windshield glass 20 as seen from the vehicle front side. For this reason, the supply portions 34A of the washer nozzle 34 are disposed along the front pillar 12A on the left side as seen from the vehicle front side. In a case where the wiper blade 24 and the wiper blade 26 pivot back and forth between the lower end portion and the right side end portion of the front windshield glass 20, the supply portions 34A of the washer nozzle 34 are disposed along the front pillar 12A on the right side as seen from the vehicle front side.

(Action and Effects of the Present Exemplary Embodiment)

In the vehicle window washer device 10 pertaining to the present exemplary embodiment, the same action and effects as the action and effects obtained by the vehicle window washer device 10 pertaining to the first exemplary embodiment can be obtained.

Furthermore, in the vehicle window washer device 10 pertaining to the present exemplary embodiment, the supply portions 34A are disposed on the other reversal position 30B side of the wiping region 30 and are not disposed on the other reversal position side of the wiping region 32. For this reason, the field of view of the occupant can be well maintained.

First Example Modification

Figure 24A:
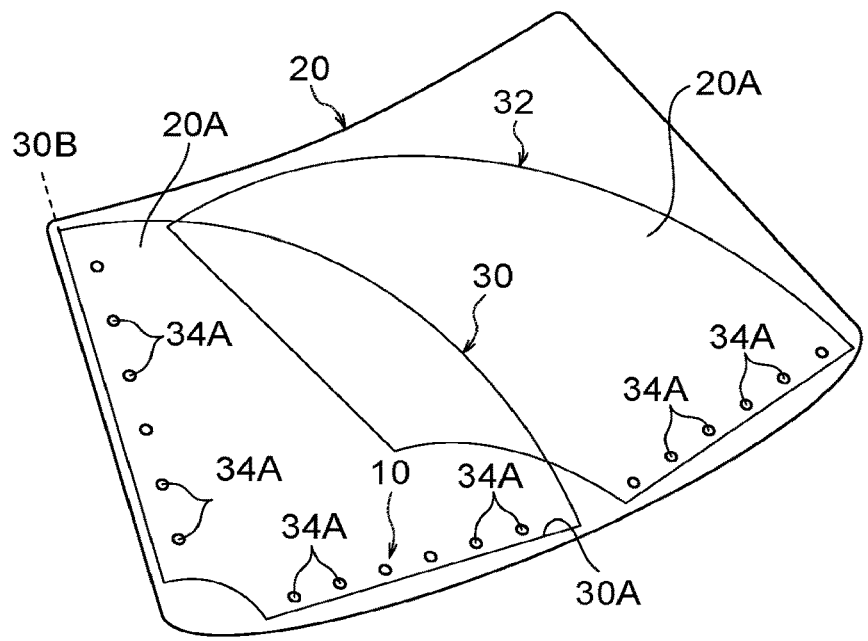
FIG. 24(A) is a schematic view of the windshield glass and the wiping regions thereof and describes placement positions of supply portions of a washer nozzle of a vehicle window washer device pertaining to a first example modification of the fourth exemplary embodiment.

As shown in FIG. 24(A), a vehicle window washer device 10 pertaining to a first example modification of the fourth exemplary embodiment is a combination of the vehicle window washer device pertaining to the fourth exemplary embodiment and the vehicle window washer device 10 pertaining to any of the first exemplary embodiment to the third exemplary embodiment. That is, in the vehicle window washer device 10 pertaining to the first example modification, the supply portions 34A of the washer nozzle 34 are disposed along each of the one reversal position 30A of the wiping region 30 and the one reversal position of the wiping region 32. Moreover, the supply portions 34A are disposed along the other reversal position 30B of the wiping region 30.

In the vehicle window washer device 10 pertaining to the first example modification, the washer fluid is supplied from the supply portions 34A to the wiping region 30 each time the wiper blade 24 shown in FIG. 1 and elsewhere that pivots back and forth reverses direction at the one reversal position 30A and the other reversal position 30B. For this reason, the efficiency with which the wiping region 30 is cleaned can be improved.

Furthermore, in the wiping region 32, the washer fluid is supplied from the supply portions 34A each time the wiper blade 26 that pivots back and forth doubles back, and some of the washer fluid supplied to the wiping region 30 is supplied to the wiping region 32 each time the wiper blade 26 coincides with the wiping region 30, so the efficiency with which the wiping region 32 is cleaned can likewise be improved.

Second Example Modification

Figure 24B:
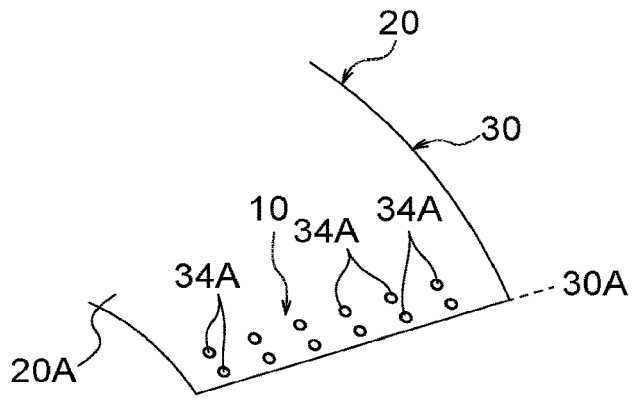
FIG. 24(B) is a schematic view of a wiping region and describes placement positions of supply portions of a washer nozzle of a vehicle window washer device pertaining to a second example modification.

As shown in FIG. 24(B), in a vehicle window washer device 10 pertaining to a second example modification of the fourth exemplary embodiment, supply portions 34A placed at regular intervals along the vehicle width direction are disposed in plural rows on the vehicle upper side of the one reversal position 30A of the wiping region 30. Here, the positions of the supply portions 34A in the vehicle up and down direction coincide with each other, and the supply portions 34A are disposed in two rows in the same direction.

In the vehicle window washer device 10 pertaining to the second example modification, plural rows of the supply portions 34A are disposed in the wiping region 30, so the amount of washer fluid supplied to the wiping region 30 can be increased. For this reason, the efficiency with which the wiping region 30 is cleaned can be improved. It should be noted that, although it is not shown in the drawings, like in the wiping region 30, plural rows of the supply portions 34A are disposed in the wiping region 32. It should also be noted that the supply portions 34A may be disposed in three or more rows.

Third Example Modification

Figure 24C:
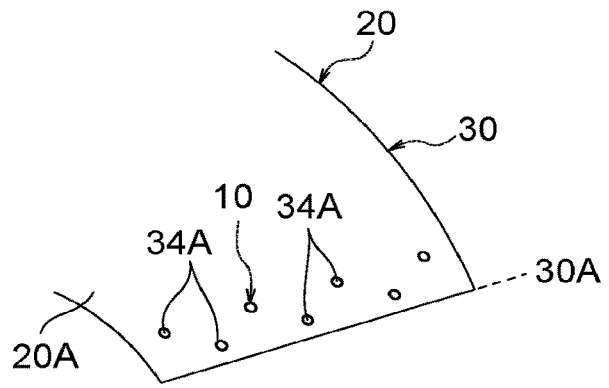
FIG. 24(C) is a schematic view of a wiping region and describes placement positions of supply portions of a washer nozzle of a vehicle window washer device pertaining to a third example modification.

As shown in FIG. 24(C), in a vehicle window washer device 10 pertaining to a third example modification of the fourth exemplary embodiment, plural supply portions 34A placed in a staggered manner at regular intervals along the vehicle width direction are disposed along the one reversal position 30A of the wiping region 30.

In the vehicle window washer device 10 pertaining to the third example modification, the supply portions 34A are disposed in a staggered manner in the wiping region 30, so flexibility can be achieved for the spacing between the supply portions 34A in the vehicle width direction. For this reason, the number of the supply portions 34A can be increased in the vehicle width direction in the wiping region 30 to increase the amount of washer fluid supplied to the wiping region 30, so the efficiency with which the wiping region 30 is cleaned can be improved. It should be noted that, like in the wiping region 30, the supply portions 34A are disposed in a staggered manner in the wiping region 32, which is not shown in FIG. 24(C). Furthermore, plural rows of the supply portions 34A may also be disposed along the front pillar 12A (the other reversal position 30B), and the supply portions 34A may also be disposed in a staggered manner along the front pillar 12A.

Fifth Exemplary Embodiment

A vehicle window washer device 10 pertaining to a fifth exemplary embodiment of the present invention will be described using FIG. 25 and FIG. 26.

(Configuration of the Vehicle Window Washer Device 10)

Figure 25A:
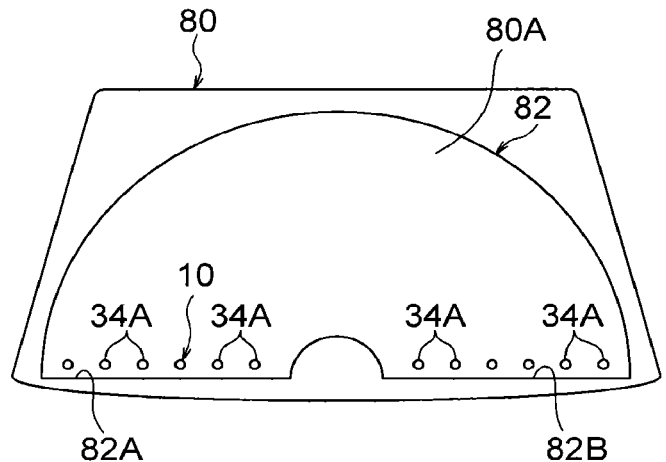
FIG. 25(A) is a schematic view, seen from the vehicle rear side, of a rear windshield glass and a wiping region thereof and describes placement positions of supply portions of a washer nozzle of a vehicle window washer device pertaining to a fifth exemplary embodiment.

As shown in FIG. 25(A), the vehicle window washer device 10 pertaining to the present exemplary embodiment is applied to a rear windshield glass 80 disposed in a rear portion of the automobile 12 (see FIG. 1). That is, a washer nozzle 34 (see FIG. 3, etc.) in which supply portions 34A are disposed so as to not project from a wiping surface 80A are disposed in a wiping region 82, wiped by a non-illustrated rear wiper blade, of the rear windshield glass 80. Specifically, a plurality of the supply portions 34A are placed at regular intervals along the vehicle width direction along each of one reversal position (a left reversal position as seen from the vehicle rear side) 82A of the wiping region 82 and another reversal position (a right reversal position as seen from the same directional side) 82B. In the present exemplary embodiment, a non-illustrated pivot shaft is disposed in the middle of the lower end portion of the rear windshield glass 80, and the rear wiper blade pivots back and forth in an angular range of substantially 180 degrees using the pivot shaft as a pivotal center. For this reason, the one reversal position 82A and the other reversal position 82B of the wiping region 82 are both positioned on the lower end portion side of the rear windshield glass 80.

(Action and Effects of the Present Exemplary Embodiment)

In the vehicle window washer device 10 pertaining to the present exemplary embodiment, the same action and effects as the action and effects obtained by the vehicle window washer device 10 pertaining to the first exemplary embodiment can be obtained even in a case where the vehicle window washer device 10 is applied to the rear windshield glass 80.

First Example Modification

Figure 25B:
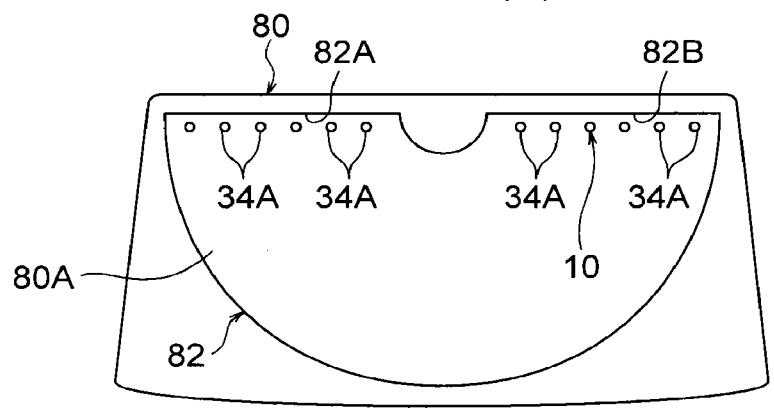
FIG. 25(B) is a schematic view, corresponding to FIG. 25(A), describing placement positions of supply portions of a vehicle window washer device pertaining to a first example modification.

As shown in FIG. 25(B), in a vehicle window washer device 10 pertaining to a first example modification of the fifth exemplary embodiment, the shape of the wiping region 82 and the placement positions of the supply portions 34A are inverted in the up and down direction from what they are in the vehicle window washer device 10 pertaining to the fifth exemplary embodiment. That is, the non-illustrated pivot shaft is disposed in the middle of the upper end portion of the rear windshield glass 80, and the non-illustrated rear wiper blade pivots back and forth in an angular range of substantially 180 degrees using the pivot shaft as a pivotal center. The one reversal position 82A and the other reversal position 82B of the wiping region 82 are positioned on the upper end portion side of the rear windshield glass 80, and a plurality of the supply portions 34A of the washer nozzle 34 shown in FIG. 1 and elsewhere are placed at regular intervals along the vehicle width direction along each of the one reversal position 82A and the other reversal position 82B of the wiping region 82.

In the vehicle window washer device 10 pertaining to the first example modification, the same action and effects as the action and effects obtained by the vehicle window washer device 10 pertaining to the fifth exemplary embodiment can be obtained.

Second Example Modification

Figure 25C:
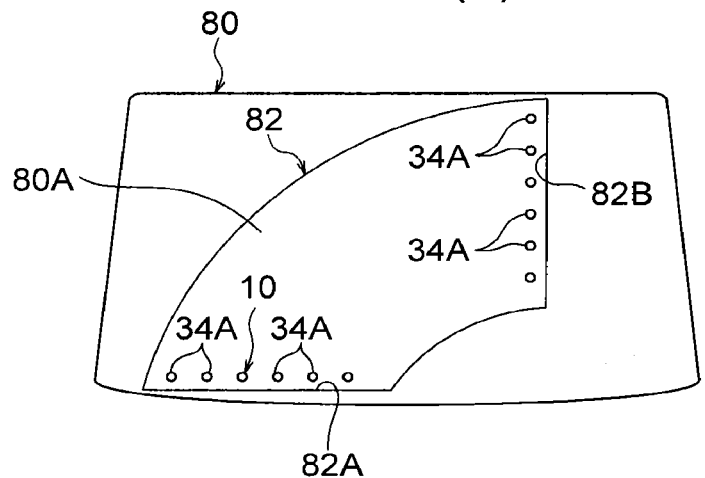
FIG. 25(C) is a schematic view, corresponding to FIG. 25(A), describing placement positions of supply portions of a washer nozzle of a vehicle window washer device pertaining to a second example modification.

As shown in FIG. 25(C), in a vehicle window washer device 10 pertaining to a second example modification of the fifth exemplary embodiment, the shape of the wiping region 82 is different from what it is in the vehicle window washer device 10 pertaining to the fifth exemplary embodiment. The non-illustrated pivot shaft is disposed nearer the right side of the lower end portion of the rear windshield glass 80 as seen from the vehicle rear side, and the non-illustrated rear wiper blade pivots back and forth in an angular range of substantially 90 degrees using the pivot shaft as a pivotal center. The one reversal position (a lower reversal position) 82A of the wiping region 82 is positioned on the lower end portion side of the rear windshield glass 80, and the other reversal position (an upper reversal position) 82B is positioned on the side end portion side of the rear windshield glass 80. Additionally, a plurality of the supply portions 34A of the washer nozzle 34 shown in FIG. 1 and elsewhere are disposed at regular intervals along the vehicle width direction along the one reversal position 82A, and a plurality of the supply portions 34A of the washer nozzle 34 shown in FIG. 1 and elsewhere are disposed at regular intervals along the vehicle up and down direction along the other reversal position 82B.

In the vehicle window washer device 10 pertaining to the second example modification, the same action and effects as the action and effects obtained by the vehicle window washer device 10 pertaining to the fifth exemplary embodiment can be obtained.

Third Example Modification

As shown in FIG. 26(A), in a vehicle window washer device 10 pertaining to a third example modification of the fifth exemplary embodiment, the supply portions 34A of the washer nozzle 34 are disposed along the one reversal position 82A of the wiping region 82 in the vehicle window washer device 10 pertaining to the second example modification. That is, a plurality of the supply portions 34A are placed at regular intervals along the lower end portion of the rear windshield glass 80.

Fourth Example Modification

As shown in FIG. 26(B), in a vehicle window washer device 10 pertaining to a fourth example modification of the fifth exemplary embodiment, a plurality of the supply portions 34A are placed at regular intervals along the upper end portion of the rear windshield glass 80 in the vehicle window washer device 10 pertaining to the second example modification.

Fifth Example Modification

As shown in FIG. 26(C), in a vehicle window washer device 10 pertaining to a fifth example modification of the fifth exemplary embodiment, the shape of the wiping region 82 and the array positions of the supply portions 34A are inverted in the up and down direction and the right and left direction from what they are in the vehicle window washer device 10 pertaining to the second example modification.

Sixth Exemplary Embodiment

A vehicle window washer device 10 pertaining to a sixth exemplary embodiment of the present invention will be described using FIG. 27(A) to FIG. 27(C).

(Configuration of the Vehicle Window Washer Device 10)

Figure 27A:
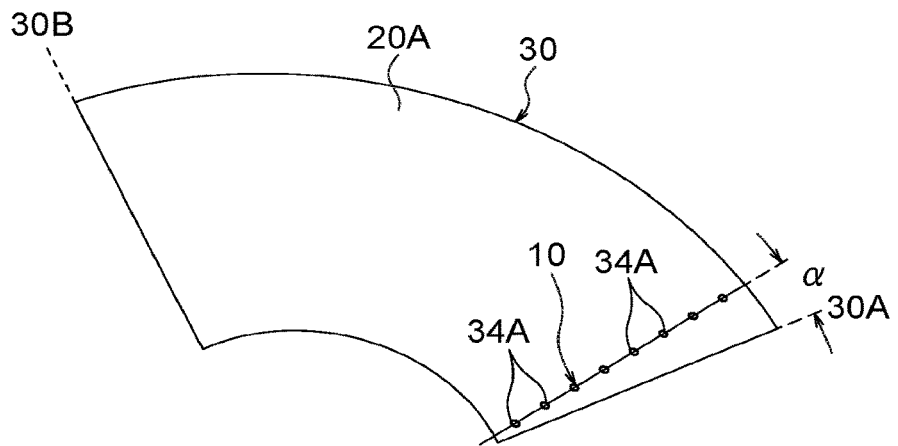
FIG. 27(A) is a schematic view of a wiping region seen from the vehicle front side and describes placement positions of supply portions of a washer nozzle of a vehicle window washer device pertaining to a sixth exemplary embodiment.

As shown in FIG. 27(A), the vehicle window washer device 10 pertaining to the present exemplary embodiment is an example modification of the vehicle window washer device 10 pertaining to the first exemplary embodiment. That is, the direction in which the supply portions 34A of the washer nozzle 34 are arrayed slopes a certain angle α with respect to the one reversal position 30A of the wiping region 30. In the present exemplary embodiment, the distance between the supply portions 34A and the one reversal position 30A gradually increases heading away from the pivot shaft 28A, which is not shown in FIG. 27(A).

(Action and Effects of the Present Exemplary Embodiment)

In the vehicle window washer device 10 pertaining to the present exemplary embodiment, the same action and effects as the action and effects obtained by the vehicle window washer device 10 pertaining to the first exemplary embodiment can be obtained.

Furthermore, in the vehicle window washer device 10 pertaining to the present exemplary embodiment, the direction in which the supply portions 34A of the washer nozzle 34 are arrayed slopes with respect to the one reversal position 30A of the wiping region 30, so the supply portions 34A are sequentially placed in positions a little offset from each other heading in the pivoting direction of the wiper blade 24. For this reason, new washer fluid is sequentially supplied to the wiper blade 24 from the supply portions 34A in the range of the certain angle α.

It should be noted that, in the wiping region 32, which is not shown in FIG. 27(A), like in the wiping region 30, the direction in which the supply portions 34A are arrayed slopes with respect to the one reversal position. Furthermore, although description is omitted here, the vehicle window washer device 10 pertaining to the sixth exemplary embodiment can also be applied to the direction in which the supply portions 34A are arrayed in the wiping region 82 of the rear windshield glass 80 (see FIG. 25 and FIG. 26).

First Example Modification

Figure 27B:
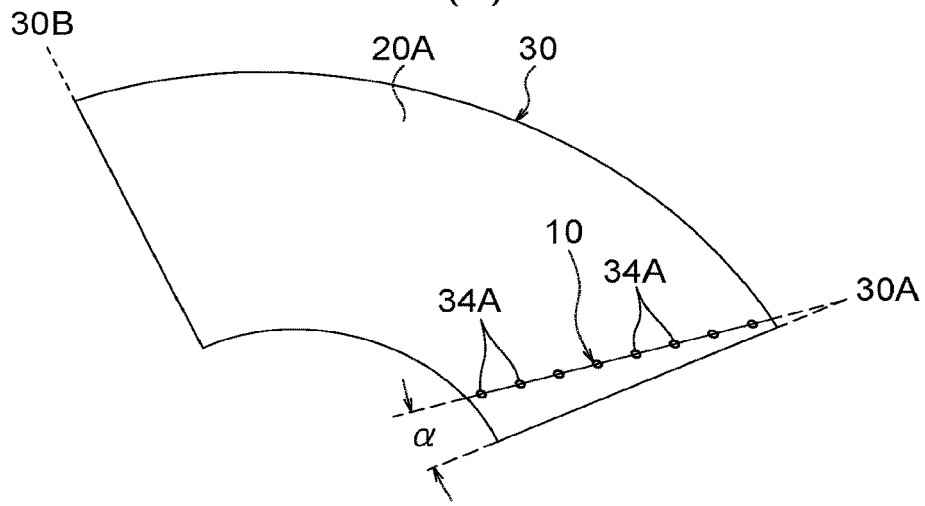
FIG. 27(B) is a schematic view, corresponding to FIG. 27(A), describing placement positions of supply portions of a washer nozzle of a vehicle window washer device pertaining to a first example modification of the sixth exemplary embodiment.

As shown in FIG. 27(B), in a vehicle window washer device 10 pertaining to a first example modification of the sixth exemplary embodiment, the distance between the supply portions 34 and the one reversal position 30A gradually decreases as the direction in which the supply portions 34A of the washer nozzle 34 are arrayed in the wiping region 30 moves away from the pivot shaft 28A, which is not shown in FIG. 27(B). That is to say, the direction in which the supply portions 34A are arrayed slopes a certain angle α with respect to the one reversal position 30A.

In the vehicle window washer device 10 pertaining to the first example modification, the same action and effects as the action and effects obtained by the vehicle window washer device 10 pertaining to the sixth exemplary embodiment can be obtained. It should be noted that the vehicle window washer device 10 pertaining to the first example modification can also be applied to each of the wiping region 32 and the wiping region 82, which are not shown in FIG. 27(B).

Second Example Modification

Figure 27C:
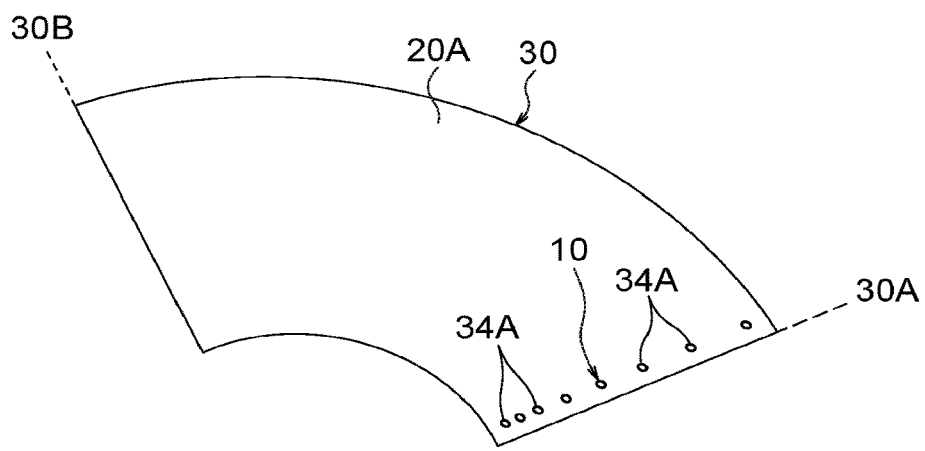
FIG. 27(C) is a schematic view, corresponding to FIG. 27(A), describing placement positions of supply portions of a washer nozzle of a vehicle window washer device pertaining to a second example modification.

As shown in FIG. 27(C), in a vehicle window washer device 10 pertaining to a second example modification of the sixth exemplary embodiment, the spacing between the supply portions 34A of the washer nozzle 34 in the wiping region 30 gradually increases heading away from the pivot shaft 28A, which is not shown in FIG. 27(C). In other words, in the wiping region 30, the number, per unit length, of the supply portions 34A placed close to the pivot shaft 28A is large, and the number, per unit length, of the supply portions 34A placed far from the pivot shaft 28A is set smaller than the number, per unit length, of the supply portions 34A placed close to the pivot shaft 28A.

In the vehicle window washer device 10 pertaining to the second example modification, the number of supply portions 34A placed close to the pivot shaft 28B in the wiping region 30 is set large, so the amount of washer fluid supplied in this area can be increased. Usually, when the wiper blade 24 is pivoted back and forth, the washer fluid supplied to the wiping region 30 is scattered to the surrounding area outside the wiping region 30 by centrifugal force acting because of the wiper blade 24. By increasing the amount of washer fluid supplied on the pivot shaft 28A side of the wiping region 30, the washer fluid spreads to the entire wiping region 30 because of the back and forth pivoting motion of the wiper blade 24. Because of this, the efficiency with which the wiping region 30 is cleaned can be improved.

It should be noted that the vehicle window washer device 10 pertaining to the second example modification can also be applied to each of the wiping region 32 and wiping region 82, which are not shown in FIG. 27(C). Furthermore, the vehicle window washer devices 10 pertaining to the sixth exemplary embodiment, the first example modification, and the second example modification can also be applied in cases where the supply portions 34A are disposed along the one reversal position 30A and the other reversal position 30B of the wiping region 30 shown in FIG. 24(A) and elsewhere or the one reversal position 82A and the other reversal position 82B of the wiping region 82 shown in FIG. 25(A) and elsewhere.

Seventh Exemplary Embodiment

A vehicle window washer device 10 pertaining to a seventh exemplary embodiment of the present invention will be described using FIG. 28(A) to FIG. 28(D).

(Configuration of the Vehicle Window Washer Device 10)

As shown in FIG. 28(A) to FIG. 28(C), the vehicle window washer device 10 pertaining to the present exemplary embodiment is equipped with a washer nozzle 84 in the wiping region 30. Here, description of the wiping region 32 shown in FIG. 1 and elsewhere will be omitted because the same washer nozzle 84 as the one disposed in the wiping region 30 is also disposed in the wiping region 82. The washer nozzle 84 is configured to include supply portions 84A, a nozzle body 84B, and a retention groove portion 84C. The nozzle body 84B extends in such a way that its longitudinal direction coincides with the vehicle width direction. The nozzle body 84B is equipped inside with a flow path 84D, which has a circular cross section and supplies the washer fluid in the vehicle width direction. One end of the nozzle body 84B is connected to the hose 38 shown in FIG. 3(B).

The retention groove portion 84C is integrally molded in the top portion on the vehicle outer side of the nozzle body 84B, is placed in such a way that its longitudinal direction coincides with the vehicle width direction, and is formed in the shape of a square U having a rectangular open shape as seen from the vehicle front side. The supply portions 84A are equipped with supply ports 84A1. A plurality of the supply portions 84A are formed at regular intervals along the vehicle width direction in the groove bottom surface of the retention groove portion 84C, and the supply portions 84A are coupled to the flow path 84D of the nozzle body 84B. In the present exemplary embodiment, the shape of the supply ports 84A1 is circular, but as described in connection with the vehicle window washer device 10 pertaining to the first exemplary embodiment, the supply ports may also be formed in the shape of an ellipse, a rectangle, a polygon, or a long hole, for example. Furthermore, although it is not shown in the drawings, the positions of the supply portions 84A are set in positions on the vehicle inner side of the wiping surface 20A on the vehicle outer side of the front windshield glass 20, because the washer nozzle 84 is equipped with the retention groove portion 84C. Additionally, the position of the vehicle outer side end (opening edge portion) of the retention groove portion 84C is set so as to not project from the wiping surface 20A of the front windshield glass 20.

As shown in FIG. 28(C), a plate-like supply member 86 whose longitudinal direction coincides with the vehicle width direction and which has a thickness that is the same as, or a little thicker than, the groove depth of the retention groove portion 84C is housed in the retention groove portion 84C. The supply member 86 is made of a lubricating material that absorbs the washer fluid supplied from the supply portions 84A and becomes lubricated and from which the washer fluid is squeezed out when the wiper blade 24 passes across it. Felt or rubber, for example, can be used as the lubricating material.

In the vehicle window washer device 10 pertaining to the present exemplary embodiment, the same action and effects as the action and effects obtained by the vehicle window washer device 10 pertaining to the first exemplary embodiment can be obtained.

Furthermore, in the vehicle window washer device 10 pertaining to the present exemplary embodiment, the supply member 86 is disposed on the supply portions 84A of the washer nozzle 84, so the washer fluid supplied from the supply portions 84A is supplied via the supply member 86 to the wiping region 30. The washer fluid is temporarily retained in the supply member 86 and is supplied to the wiping region 30 a little at a time from the supply member 86 each time the wiper blade 24 pivots back and forth, so the cleaning effect can be sustained.

It should be noted that the vehicle window washer device 10 pertaining to the present exemplary embodiment may have the washer nozzle 84 and the supply member 86 disposed along each of the one reversal position 30A and the other reversal position 30B of the wiping region 30. Furthermore, the vehicle window washer device 10 pertaining to the present exemplary embodiment can also be applied to the wiping region 32 and the wiping region 82, which are not shown in FIG. 28. Moreover, as the supply member 86 in the present exemplary embodiment, a mesh member that allows the washer fluid supplied from the supply ports 84A1 of the supply portions 84A to pass through it and supplies the washer fluid to the wiping region 30 can also be used.

Example Modification

As shown in FIG. 28(D), in a vehicle window washer device 10 pertaining to an example modification of the seventh exemplary embodiment, plural supply portions 84A are disposed along the vehicle up and down direction in the groove bottom surface of the retention groove portion 84C of the washer nozzle 84. The supply portions 84A are equipped with supply ports 84A1. Although it is not shown in FIG. 28(D), the placement of the supply portions 84A in the vehicle width direction is the same as the placement in the vehicle window washer device 10 pertaining to the seventh exemplary embodiment.

In the vehicle window washer device 10 pertaining to the example modification, the number of supply portions 84A of the washer nozzle 84 is increased, so the amount of washer fluid supplied can be increased. For this reason, the effect of cleaning the wiping region 30 can be improved.

Eighth Exemplary Embodiment

A vehicle window washer device 10 pertaining to an eighth exemplary embodiment of the present invention will be described using FIG. 29 and FIG. 30.

(Configuration of the Vehicle Window Washer Device 10)

Figure 29:
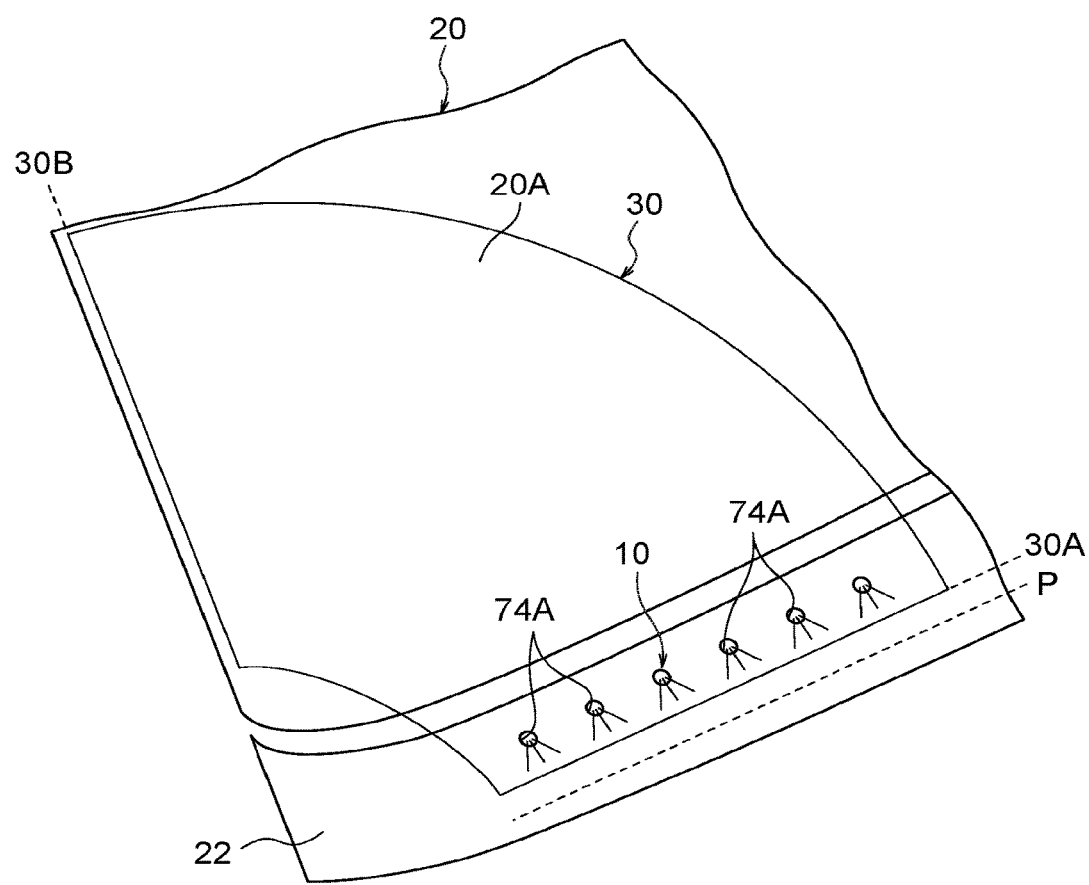
FIG. 29 is an enlarged perspective view, corresponding to FIG. 2, showing main parts of a vehicle front portion to which a vehicle window washer device pertaining to an eighth exemplary embodiment has been applied.
Figure 30:
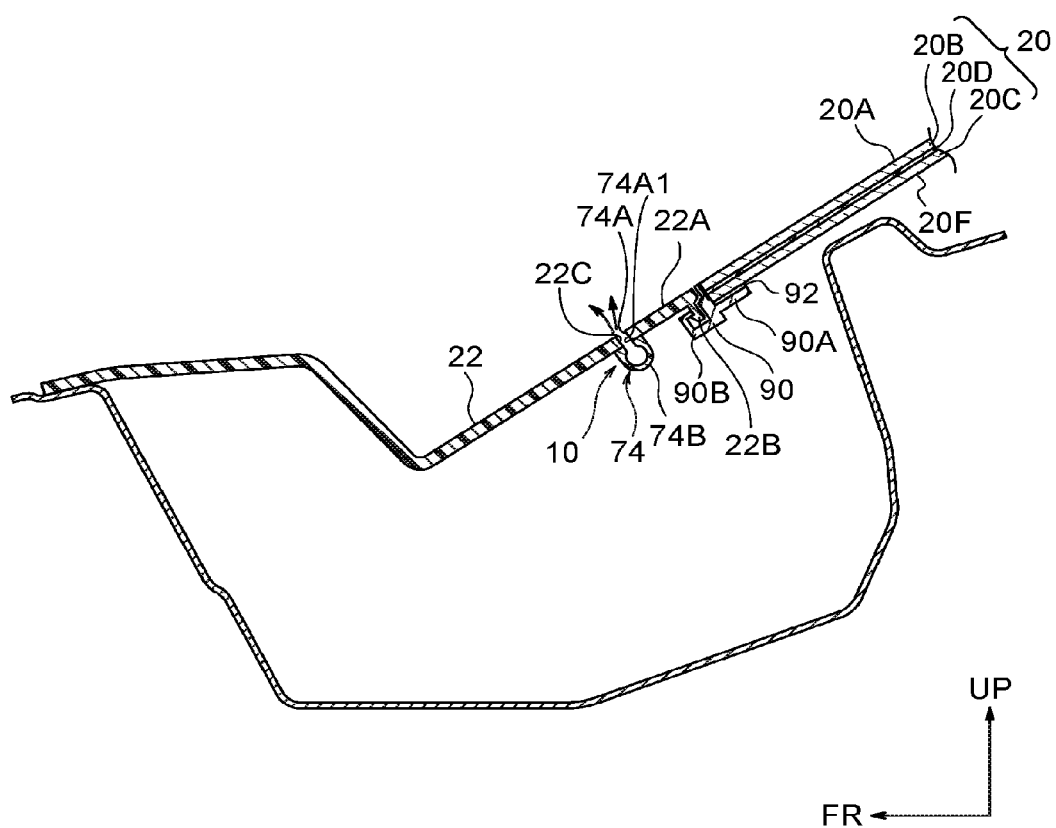
FIG. 30 is a sectional view, seen from the vehicle side, of the vehicle window washer device, the front windshield glass, and a cowl louver shown in FIG. 29.

As shown in FIG. 29 and FIG. 30, in the vehicle window washer device 10 pertaining to the present exemplary embodiment, the same washer nozzle 74 as the one in the vehicle window washer device 10 pertaining to the second example modification of the third exemplary embodiment shown in FIG. 19(A) to FIG. 19(C) is attached to the cowl louver 22. The supply portions 74A of the washer nozzle 74 are disposed in the cowl louver 22, and the supply portions 74A are formed utilizing pores 22C running through the cowl louver 22 in its plate thickness direction. The supply portions 74A are equipped with the supply ports 74A1, and the supply ports 74A1 are formed utilizing the openings of the pores 22C.

Specifically, the wiping region 30 is configured to include the wiping surface 20A on the vehicle outer side of the front windshield glass 20 and a surface 22A on the vehicle outer side of the cowl louver 22 disposed along the lower end portion of the front windshield glass 20. The lower end portion of the front windshield glass 20 and the vehicle rear end portion of the cowl louver 22 are coupled to each other via a coupling member 90, and the position of the wiping surface 20A and the position of the surface 22A coincide with each other (the wiping surface 20A and the surface 22A are even with each other). A coupling portion 90A that extends as far as the surface 20F on the vehicle inner side of the front windshield glass 20 is disposed on the vehicle rear side of the coupling member 90, and the coupling portion 90A is adhered to the surface 20F via an adhesive 92. A claw-like anchoring portion 90B is disposed on the vehicle front side of the coupling member 90, and the anchoring portion 90B is anchored to an anchored portion 22B disposed on the vehicle rear end portion of the cowl louver 22.

The wiping region 32, which is not shown in FIG. 29 and FIG. 30, is, like the wiping region 30, configured to include the surface 22A of the cowl louver 22, and the supply portions 74A of the washer nozzle 74 are disposed in the cowl louver 22 also in the wiping region 32.

It should be noted that the configurations of the vehicle window washer device 10 pertaining to the present exemplary embodiment other than that of the washer nozzle 74 are the same as the configurations of the vehicle window washer device 10 pertaining to the first exemplary embodiment. Furthermore, the configuration itself of the washer nozzle 74 is the same as the configuration of the washer nozzle 34 of the vehicle window washer device 10 pertaining to the first exemplary embodiment. Specifically, a plurality of the supply portions 74A are placed along the longitudinal direction of the washer nozzle 74, and a plurality of the supply portions 74A are placed along the one reversal position 30A on the storage position P side of the wiper blade 24 that pivots back and forth.

(Action and Effects of the Present Exemplary Embodiment)

In the vehicle window washer device 10 pertaining to the present exemplary embodiment, the same action and effects as the action and effects obtained by the vehicle window washer device 10 pertaining to the first exemplary embodiment can be obtained.

Furthermore, in the vehicle window washer device 10 pertaining to the present exemplary embodiment, the wiping region 30 is configured to include the wiping surface 20A of the front windshield glass 20 and the surface 22A of the cowl louver 22, and the supply portions 74A of the washer nozzle 74 are disposed in the cowl louver 22. For this reason, the supply portions 74A are disposed in the cowl louver 22 apart from the front windshield glass 20, so it is difficult for the supply portions 74A to enter the field of view of the occupant when the occupant looks in the vehicle forward direction through the front windshield glass 20 from the driver's seat. Consequently, the field of view of the occupant in the vehicle forward direction can be well maintained.

Supplementary Explanation to the Above Exemplary Embodiments

The present invention is not limited to the above exemplary embodiments and can be modified in a variety of ways without departing from the spirit thereof. For example, in relation to the placement of the supply portions of the washer nozzle, the present invention may also combine two or more of the vehicle window washer devices 10 pertaining to the first exemplary embodiment to the eighth exemplary embodiment including their example modifications. For example, the supply portions 34A of the washer nozzle 34 disposed along the front pillar 12A of the vehicle window washer device 10 pertaining to the fourth exemplary embodiment (see FIG. 22 and FIG. 23) may also be disposed in addition to the supply portions 74A of the washer nozzle 74 disposed in the cowl louver 22 of the vehicle window washer device 10 pertaining to the eighth exemplary embodiment (see FIG. 29 and FIG. 30).

Preferred Aspects of the Present Invention

Preferred aspects of the present invention are appended below as supplementary notes.

(Supplementary Note 1)

A vehicle window washer device comprising:

a washer tank that stores washer fluid;

a washer pump having one end connected to the washer tank and another end connected to one end portion of a hose;

a washer nozzle connected to another end portion of the hose;

a control unit that drives the washer pump to supply the washer fluid stored in the washer tank to the washer nozzle via the hose; and a supply portion that is placed in a wiping region, wiped by a wiper blade, of a windshield glass, is disposed in the washer nozzle or the windshield glass so as to not project from a wiping surface, and supplies the washer fluid from a supply port to the wiping surface.

(Supplementary Note 2)

The vehicle window washer device according to supplementary note 1, wherein the washer nozzle is formed in the shape of a tube having a closed end portion and is placed in such a way that the longitudinal direction of the washer nozzle coincides with the longitudinal direction of the wiper blade that pivots back and forth, and a plurality of the supply portions are disposed along the longitudinal direction of the washer nozzle.

(Supplementary Note 3)

The vehicle window washer device according to supplementary note 2, wherein a plurality of the supply portions are disposed along a reversal position of the wiper blade that pivots back and forth.

(Supplementary Note 4)

The vehicle window washer device according to supplementary note 3, wherein the supply portions are disposed along the reversal position on a storage position side of the wiper blade.

(Supplementary Note 5)

The vehicle window washer device according to any one of supplementary note 1 to supplementary note 4, further comprising a position detection unit that detects the pivotal position of the wiper blade in the wiping region, wherein on the basis of the result of the detection by the position detection unit the control unit executes control that drives the washer pump to supply the washer fluid from the supply portion to the wiping surface just before the wiper blade passes the supply portion.

(Supplementary Note 6)

The vehicle window washer device according to supplementary note 1, wherein the wiping region is configured to include the windshield glass and a cowl louver disposed along a lower end portion of the windshield glass, and the supply portion is placed on the cowl louver side of the wiping region and is disposed in the washer nozzle or the cowl louver so as to not project from the wiping surface.

What is claimed is:

1. A vehicle window washer device comprising:

a washer tank that stores washer fluid;

a washer pump having one end connected to the washer tank and another end connected to one end portion of a hose;

a washer nozzle connected to another end portion of the hose;

a control unit that drives the washer pump to supply the washer fluid stored in the washer tank to the washer nozzle via the hose; and a supply portion that is placed in a wiping region, wiped by a wiper blade, of a windshield glass, is disposed in the washer nozzle or the windshield glass so as to not project from a wiping surface, and supplies the washer fluid from a supply port to the wiping surface, wherein the washer nozzle is formed in the shape of a tube having a closed end portion and is placed in such a way that a longitudinal direction of the washer nozzle is along a longitudinal direction of the wiper blade in a storage position such that the longitudinal direction of the washer nozzle coincides with a vehicle width direction, and a plurality of the supply portions are disposed along the longitudinal direction of the washer nozzle.

2. The vehicle window washer device according to claim 1, wherein a plurality of the supply portions are disposed along a reversal position of the wiper blade that pivots back and forth.

3. The vehicle window washer device according to claim 2, wherein the supply portions are disposed along the reversal position on a storage position side of the wiper blade.

4. The vehicle window washer device according to claim 1, further comprising a position detection unit that detects the pivotal position of the wiper blade in the wiping region, wherein, on the basis of the result of the detection by the position detection unit, the control unit executes control that drives the washer pump to supply the washer fluid from the supply portion to the wiping surface just before the wiper blade passes the supply portion.

5. A vehicle window washer device comprising:
a washer tank that stores washer fluid;
a washer pump having one end connected to the washer tank and another end connected to one end portion of a hose;
a washer nozzle connected to another end portion of the hose;
a control unit that drives the washer pump to supply the washer fluid stored in the washer tank to the washer nozzle via the hose; and
a supply portion that is placed on a cowl louver side of a wiping region, wiped by a wiper blade, of a windshield glass, a cowl louver being disposed along a lower end portion of the windshield glass, is disposed in the washer nozzle or the cowl louver so as to not project from wiping surfaces contacted by the wiper blade, and supplies the washer fluid from a supply port to the wiping surfaces, wherein
the washer nozzle is placed in such a way that a longitudinal direction of the washer nozzle is along a longitudinal direction of the cowl louver such that the longitudinal direction of the washer nozzle coincides with a vehicle width direction,
a plurality of the supply portions are disposed along the longitudinal direction of the washer nozzle, and
a vehicle outer side surface of the windshield glass and a vehicle outer side surface of the cowl louver are the wiping surfaces.

* * * * *